(12) United States Patent
Oh et al.

(10) Patent No.: US 7,817,353 B2
(45) Date of Patent: Oct. 19, 2010

(54) ZOOM LENS BARREL ASSEMBLY

(75) Inventors: Min Soo Oh, Uiwang (KR); Sang Geol Lee, Uiwang (KR)

(73) Assignee: Power Optics Co., Ltd., Uiwang (KR)

( * ) Notice: Subject to any disclaimer, the term of this patent is extended or adjusted under 35 U.S.C. 154(b) by 0 days.

(21) Appl. No.: 12/521,643

(22) PCT Filed: Dec. 31, 2007

(86) PCT No.: PCT/KR2007/007005

§ 371 (c)(1),
(2), (4) Date: Feb. 19, 2010

(87) PCT Pub. No.: WO2008/082233

PCT Pub. Date: Jul. 10, 2008

(65) Prior Publication Data

US 2010/0208361 A1    Aug. 19, 2010

(30) Foreign Application Priority Data

Dec. 29, 2006  (KR)  ............... 10-2006-0137627
Dec. 21, 2007  (KR)  ............... 10-2007-0134839

(51) Int. Cl.
  *G02B 15/14*   (2006.01)
  *G02B 7/02*    (2006.01)
(52) U.S. Cl. ..................... 359/695; 359/822

(58) Field of Classification Search ......... 359/694–701, 359/811–824; 396/387, 411–418, 79, 85
See application file for complete search history.

(56) References Cited

U.S. PATENT DOCUMENTS

| 6,553,185 | B1 | 4/2003 | Inaba et al. ............ 396/85 |
| 7,492,536 | B2 * | 2/2009 | Nagai et al. ........... 359/821 |
| 7,719,778 | B2 * | 5/2010 | Kodaira .................. 359/822 |

FOREIGN PATENT DOCUMENTS

| JP | 2002-277713 A | 9/2002 |
| JP | 2006-78955 A | 3/2006 |
| JP | 2006-113118 A | 4/2006 |
| KR | 10-2005-0021953 A | 3/2005 |

* cited by examiner

*Primary Examiner*—Mohammed Hasan
(74) *Attorney, Agent, or Firm*—Drinker Biddle & Reath LLP

(57) ABSTRACT

Embodiments of a zoom lens barrel assembly for an imaging apparatus are provided. The zoom lens barrel has a simple structure and allows efficient space utilization in order to realize a compact size, which is currently required for a mobile imaging apparatus. The zoom lens barrel assembly can stably endure external impacts, provide more precise zoom operations, and stably operate for a long time without a malfunction of a zoom motor, which acts as a drive source. The zoom lens barrel assembly can increase the rotation gain of a driving source and improve space utilization inside a basic skeletal structure of a frame by modifying the structure of a gear train, which cooperatively connects the driving source and a rotary cam member.

25 Claims, 22 Drawing Sheets

[Fig. 1]
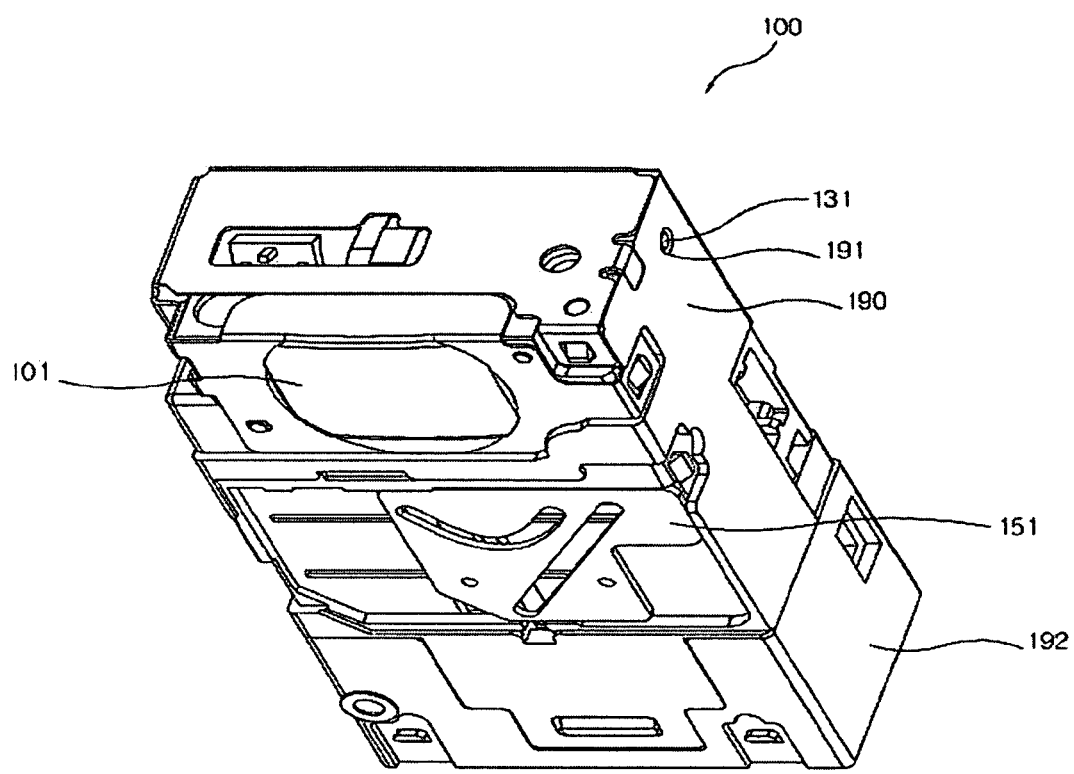

[Fig. 2]
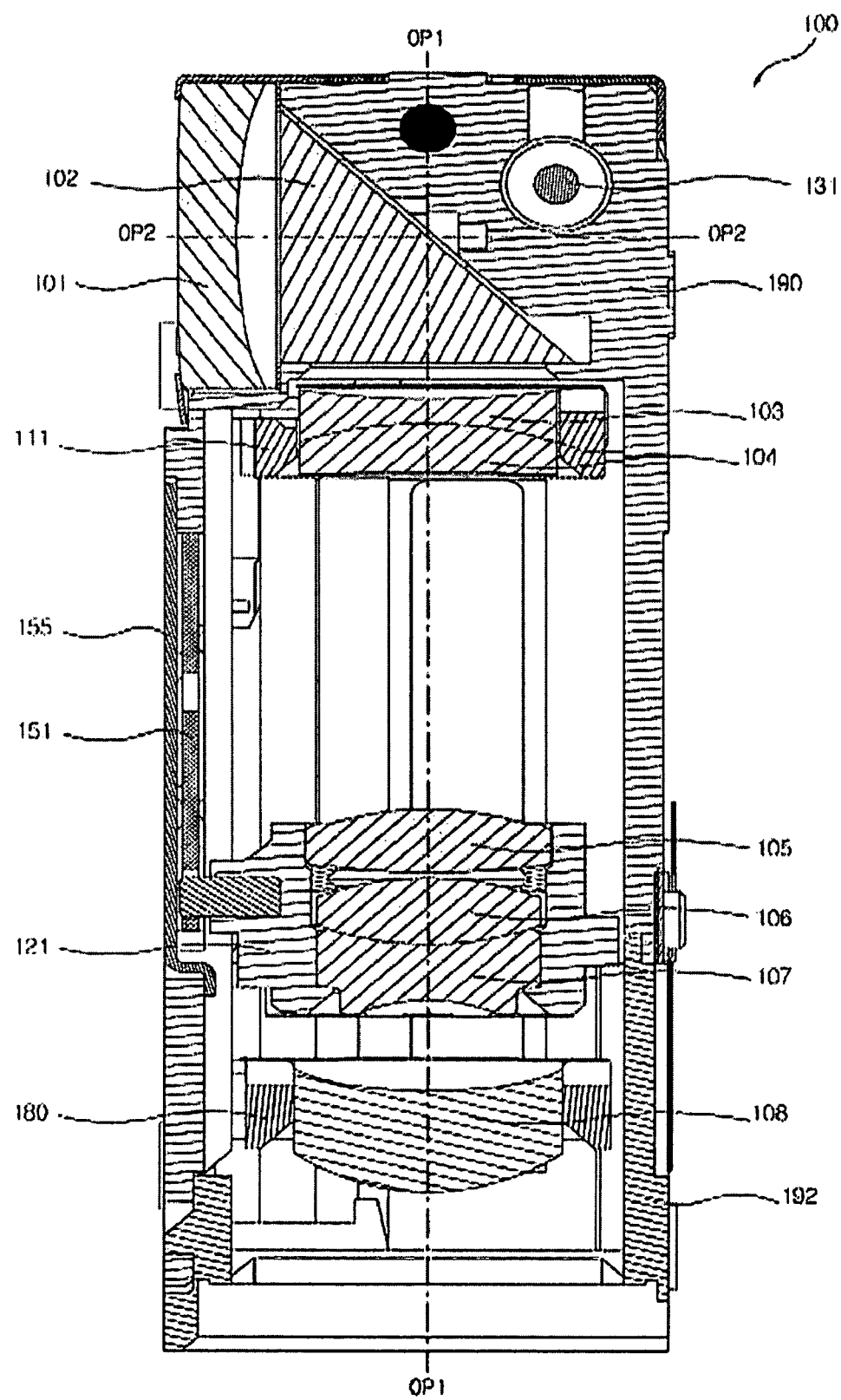

[Fig. 3]
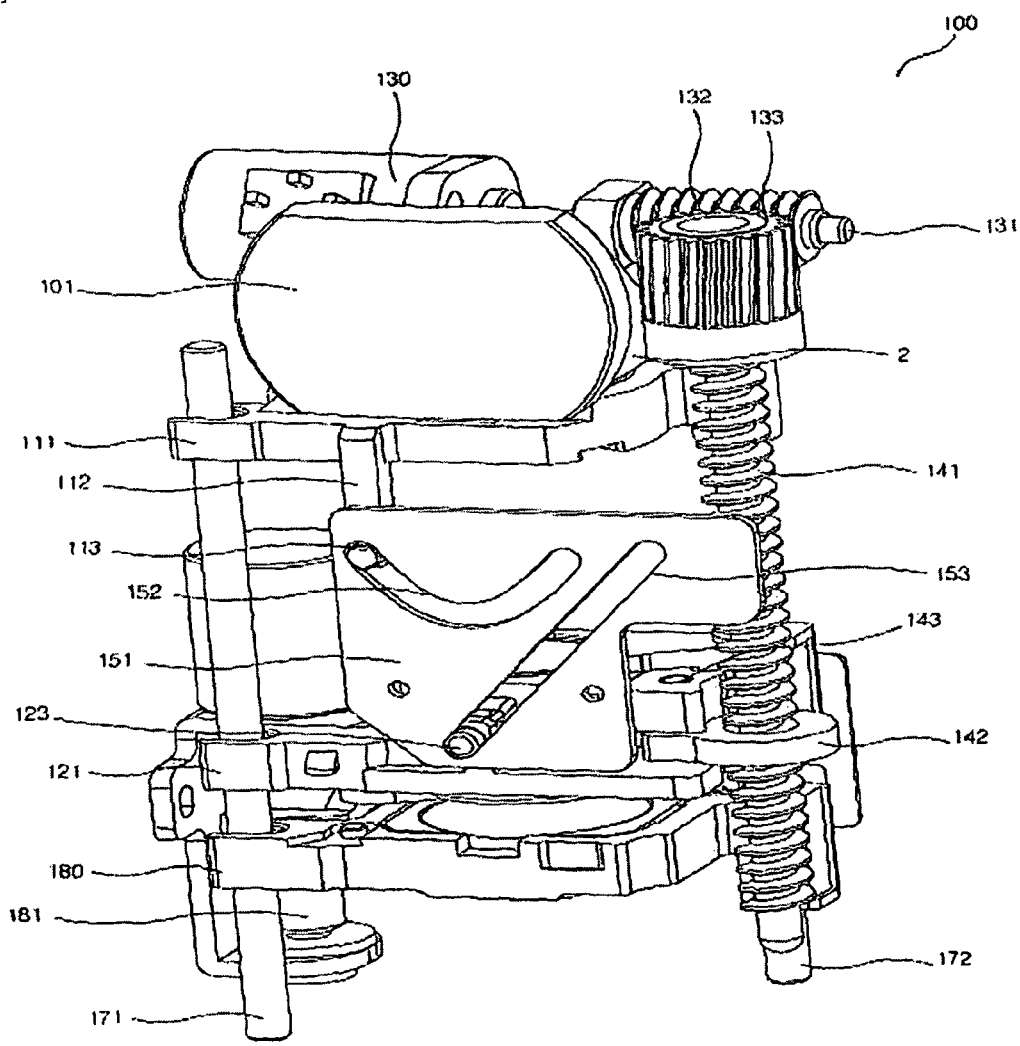

[Fig. 4]
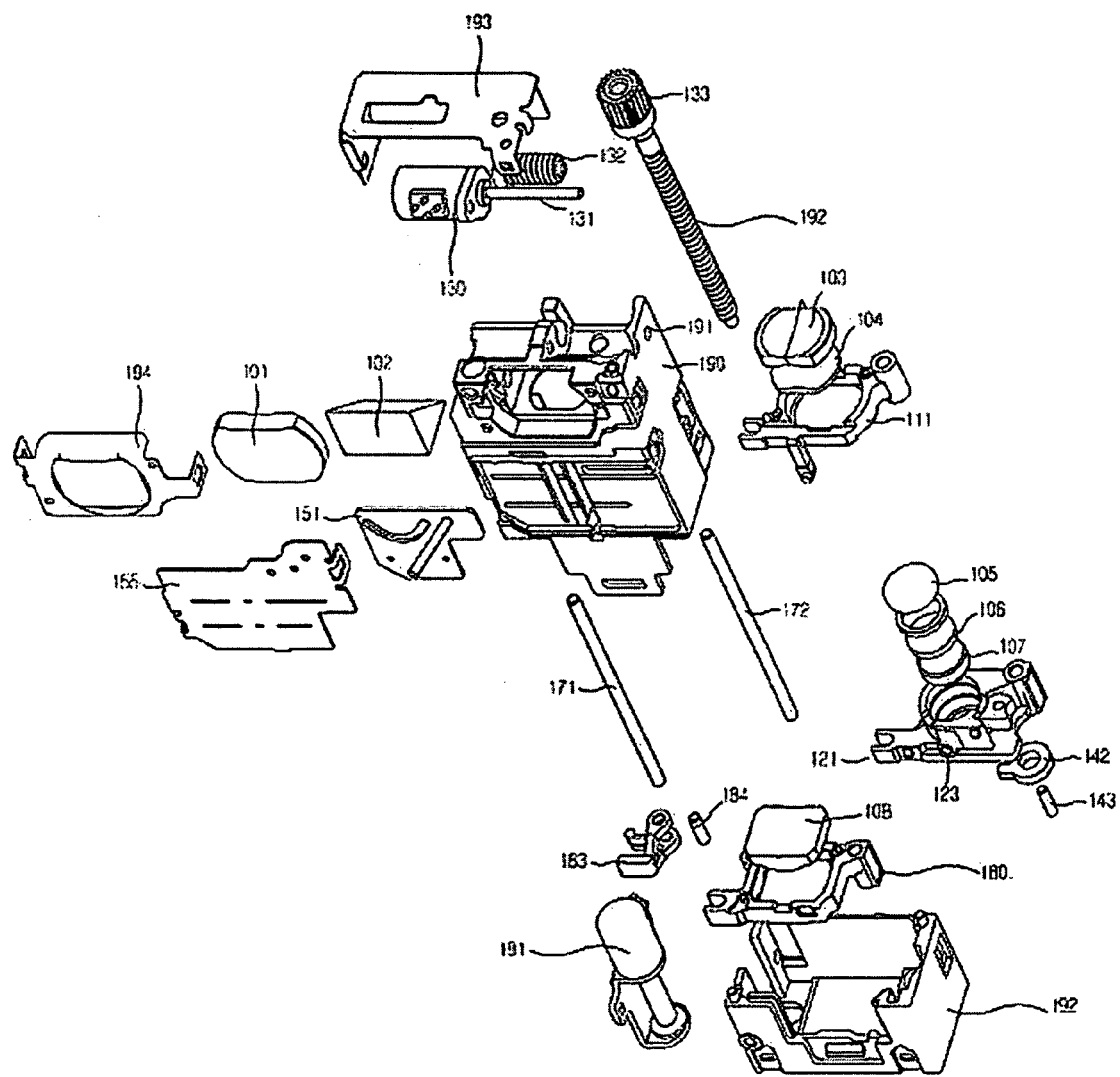

[Fig. 5]
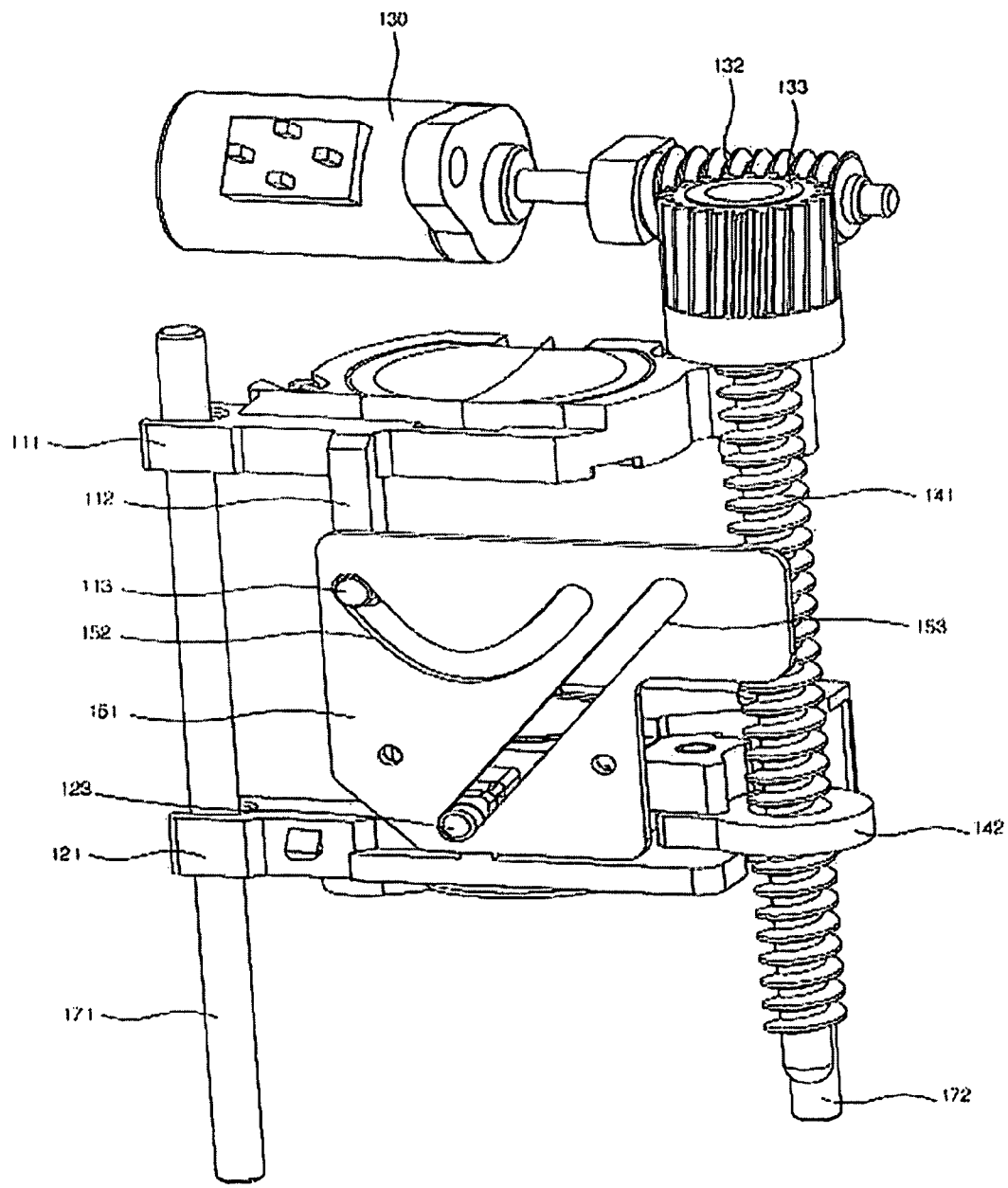

[Fig. 6]
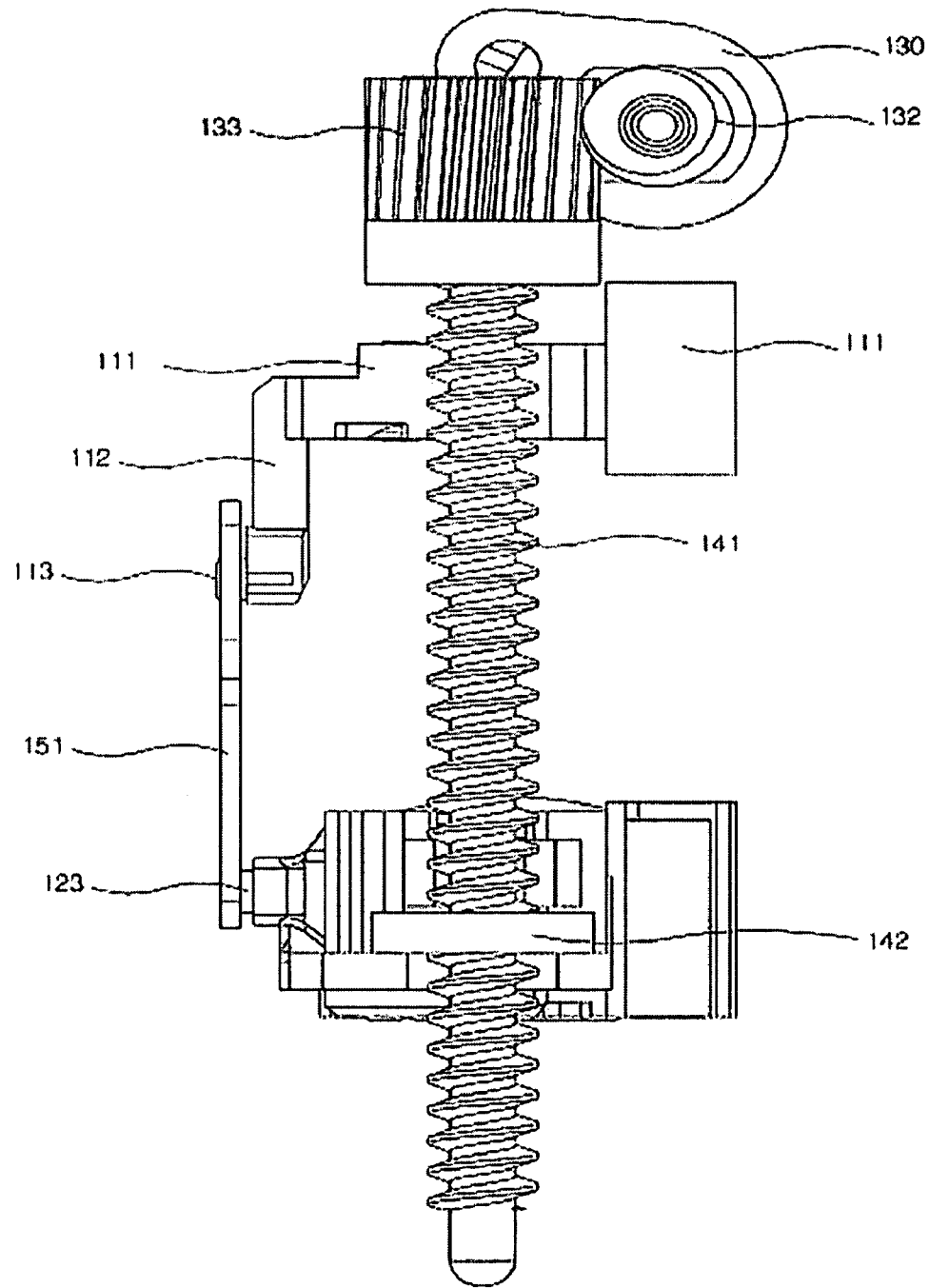

[Fig. 7]
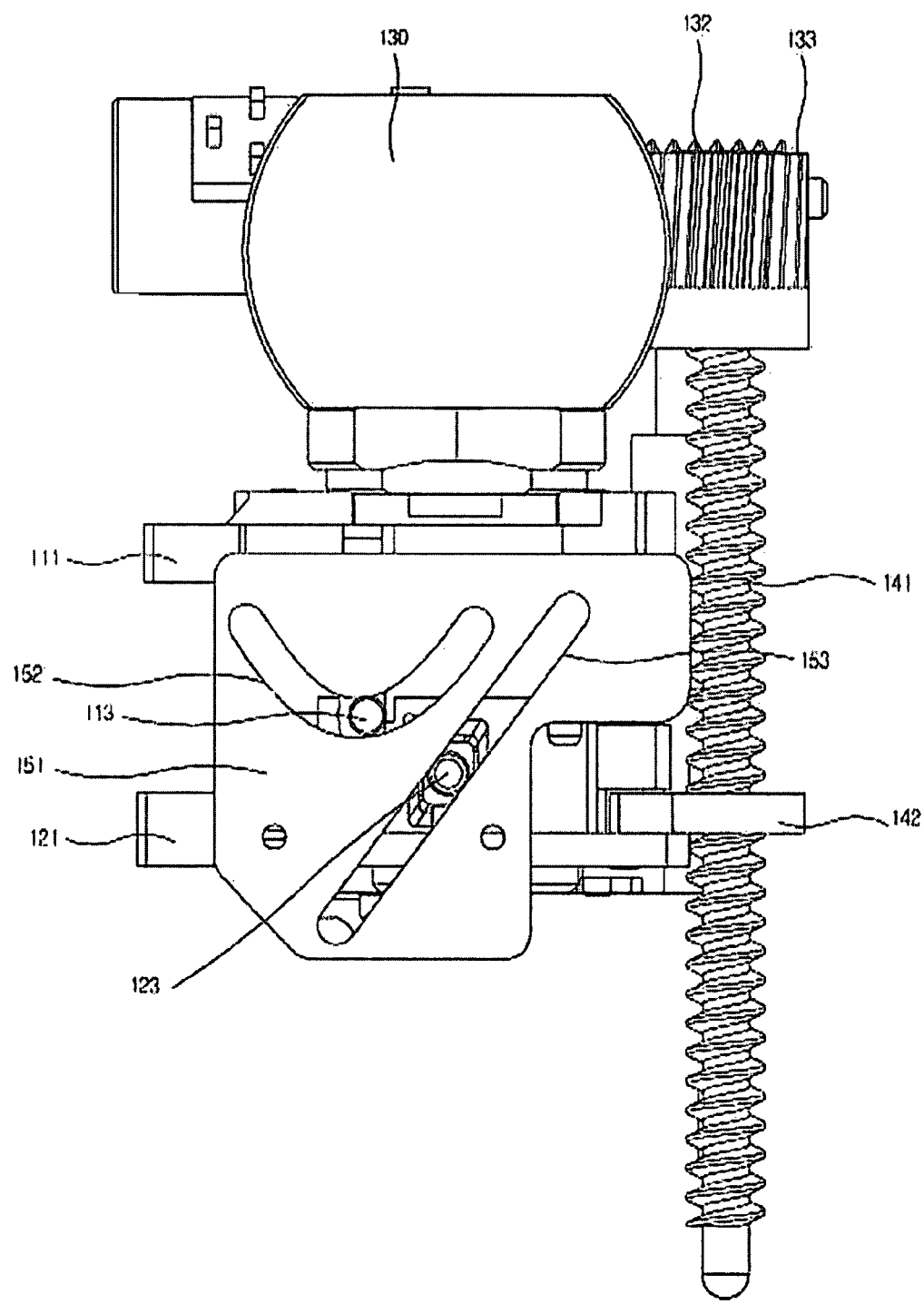

[Fig. 8]
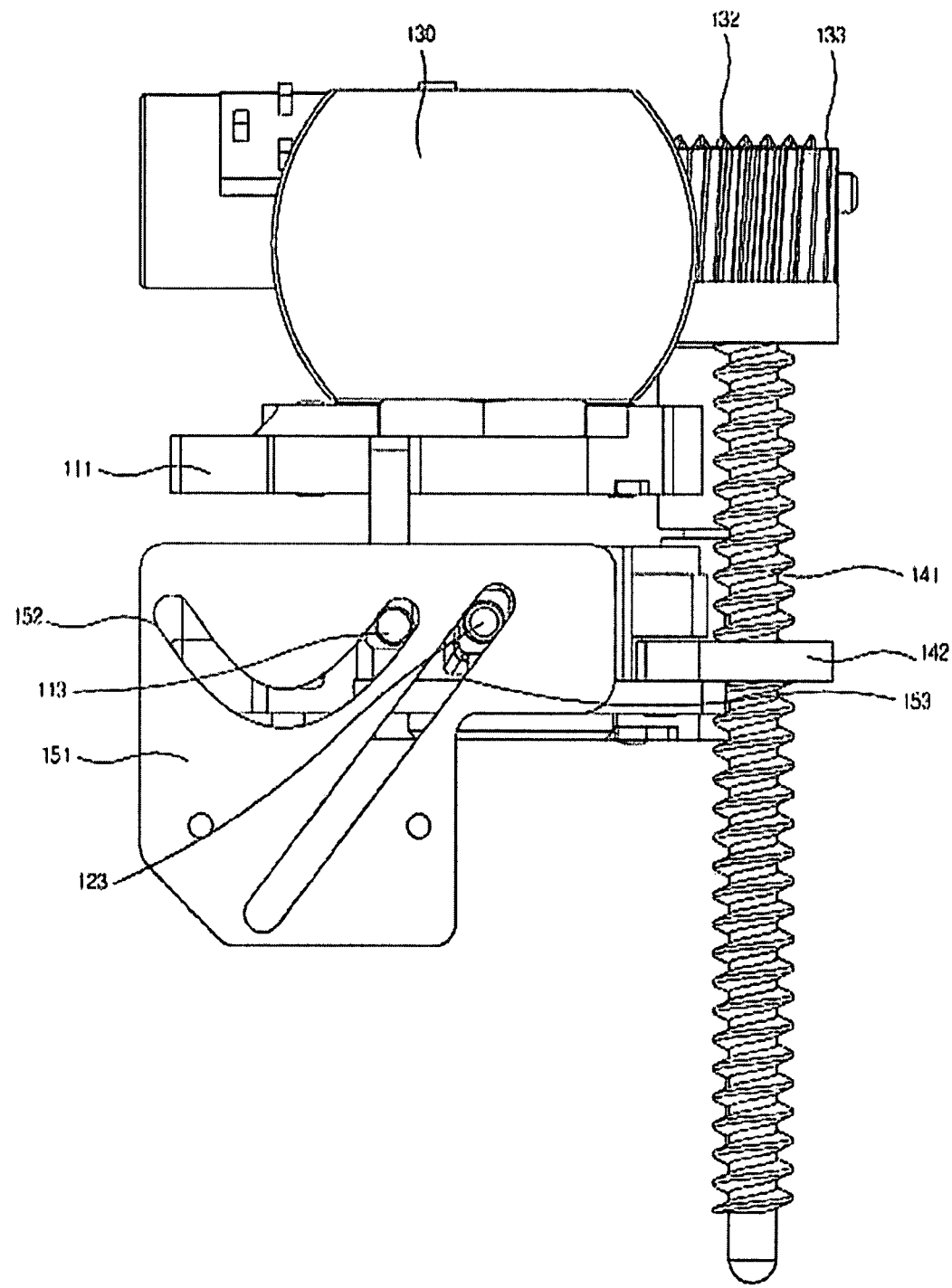

[Fig. 9]
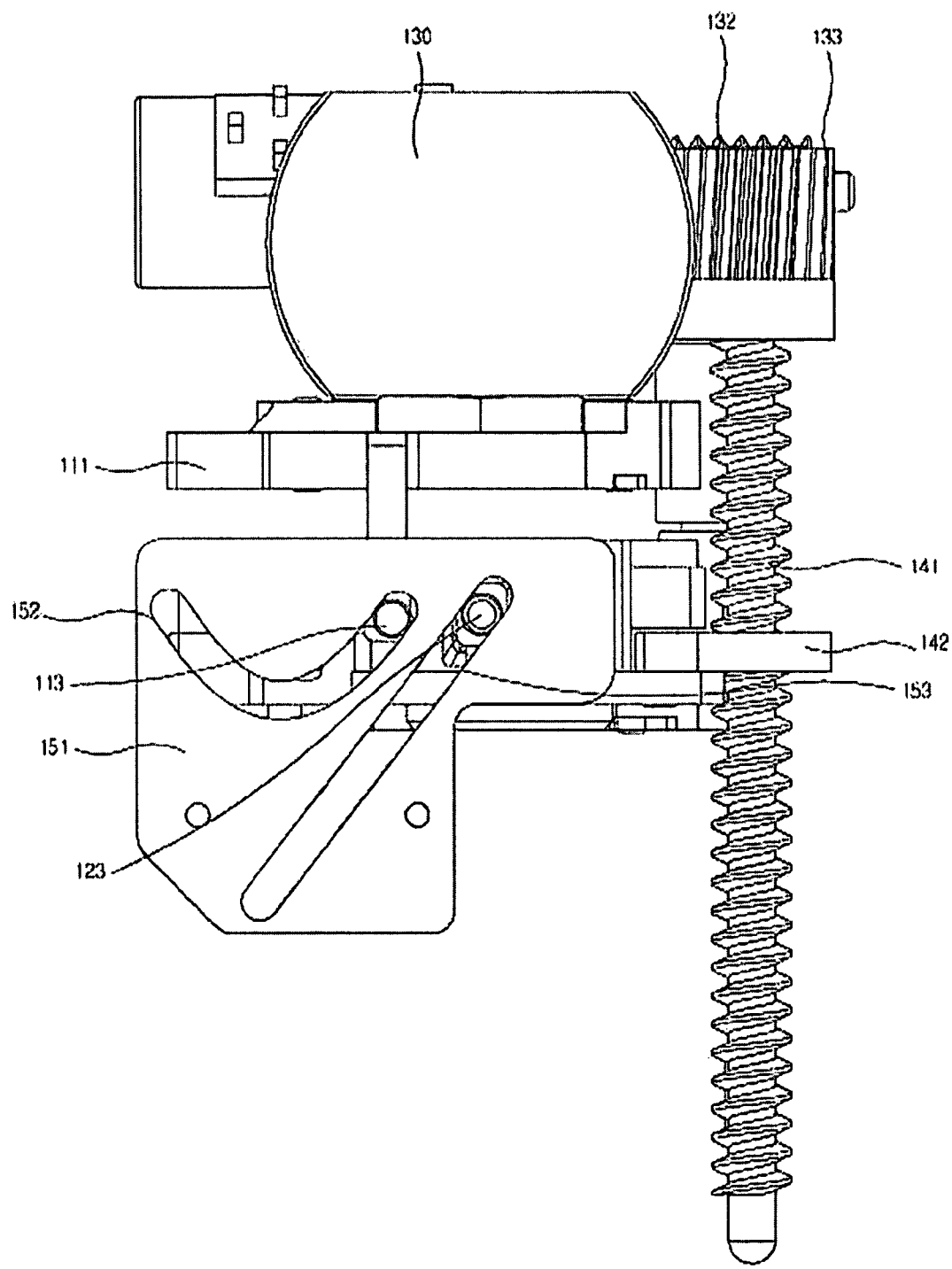

[Fig. 10]
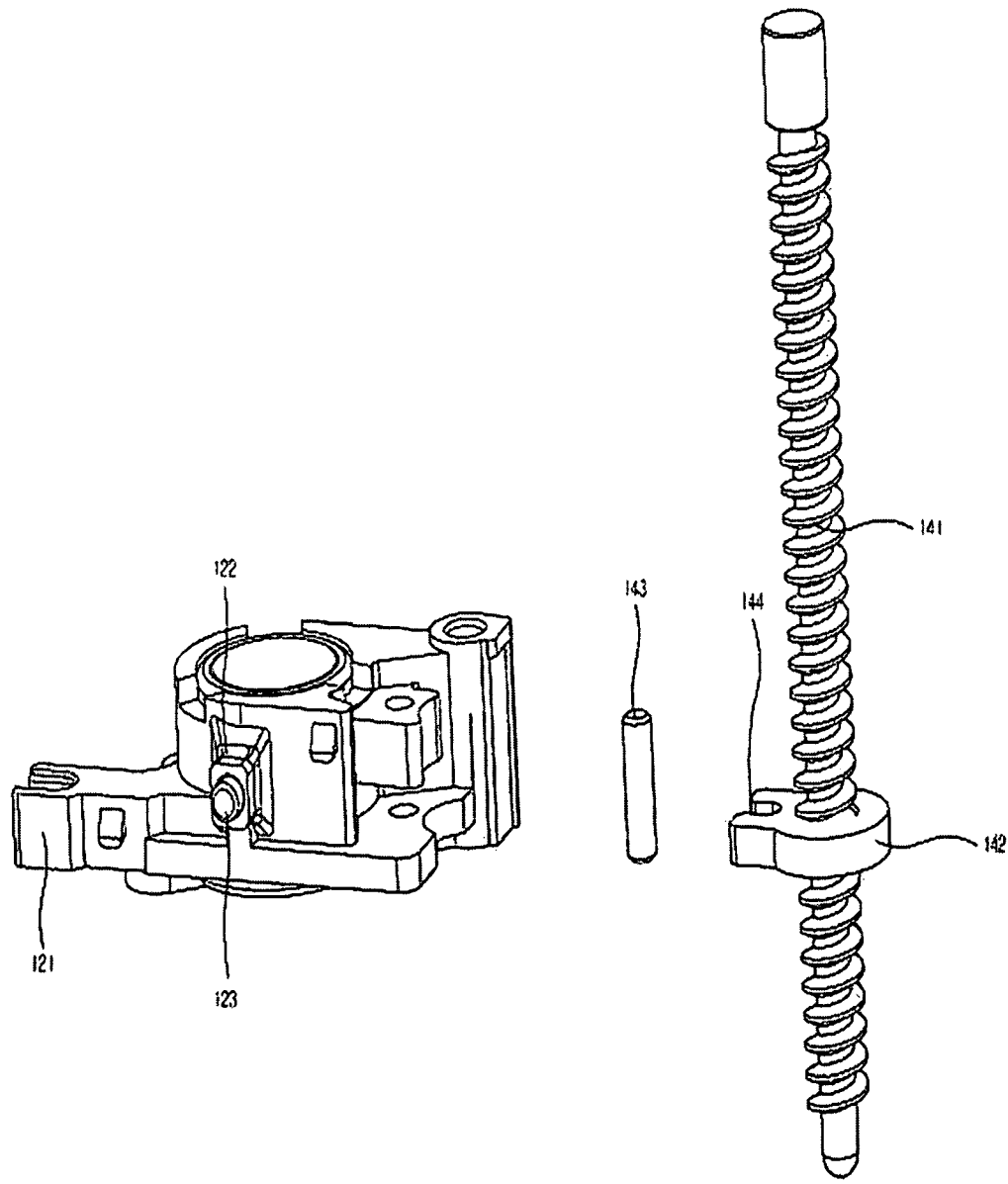

[Fig. 11]
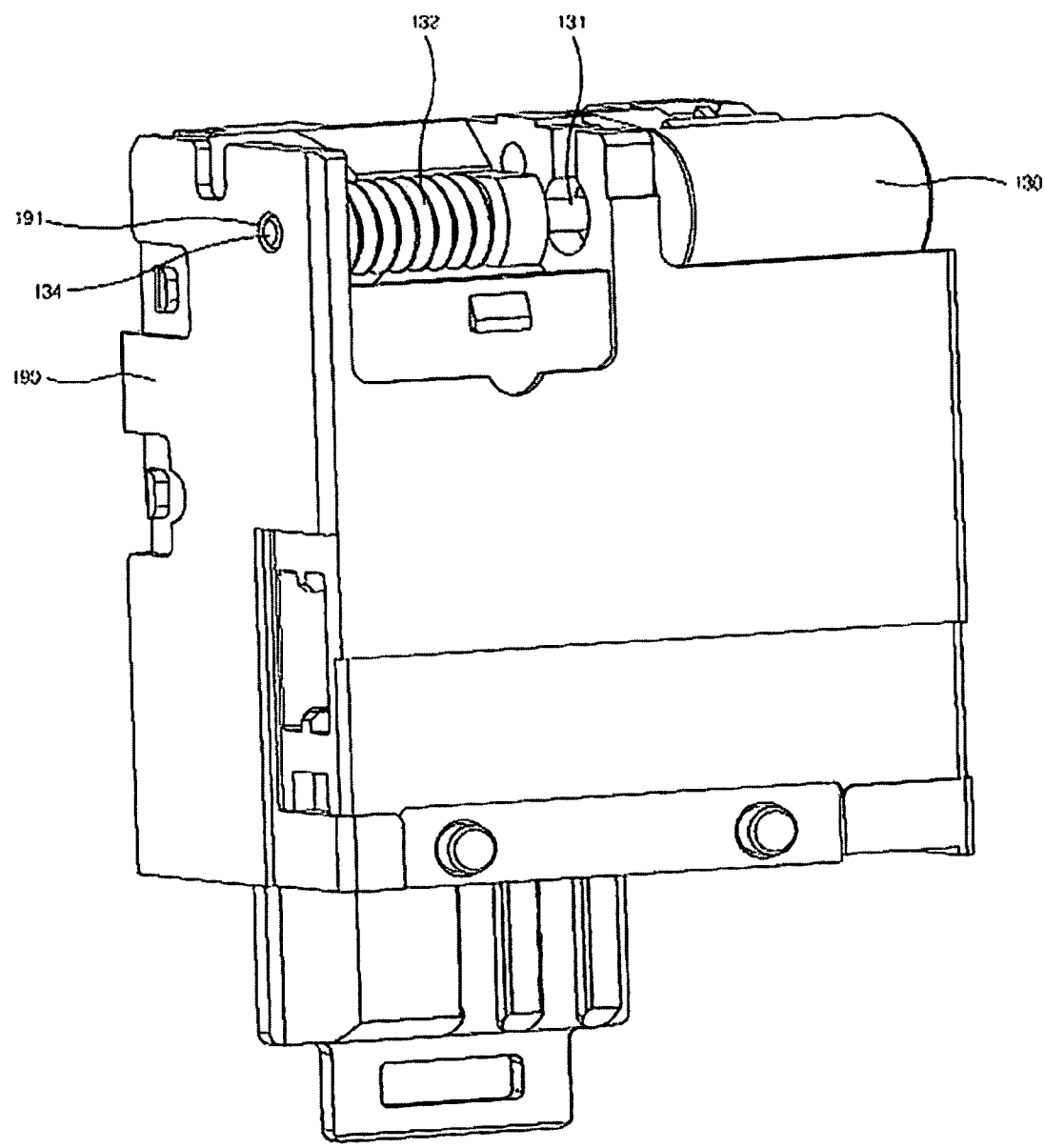

[Fig. 12]
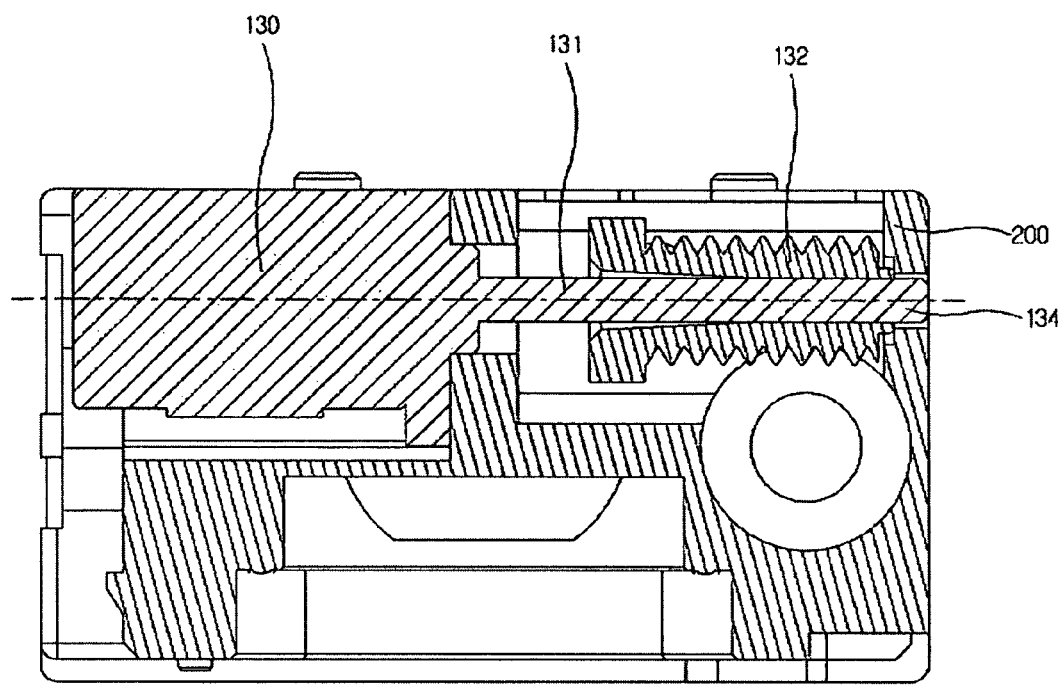

[Fig. 13]
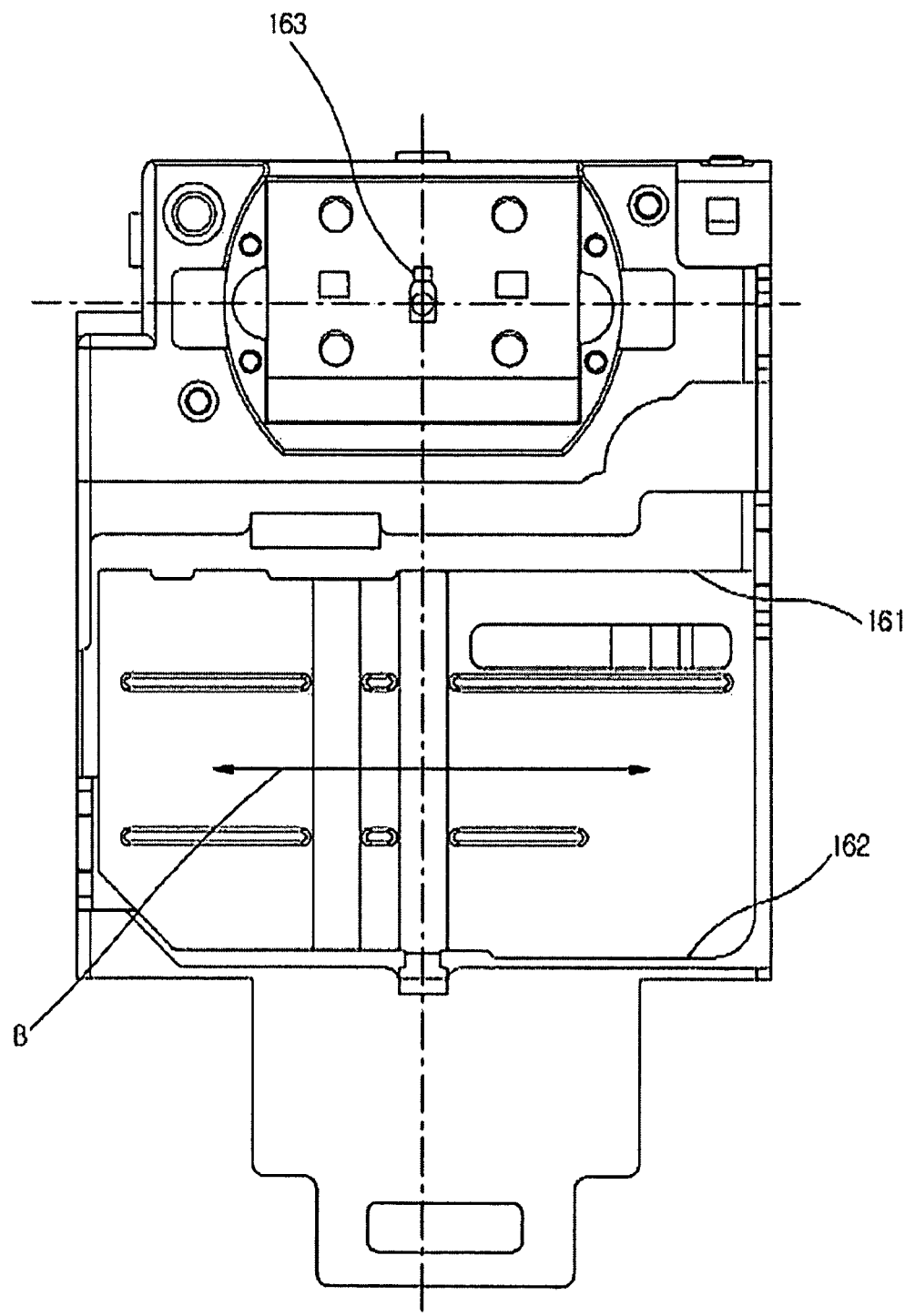

[Fig. 14]
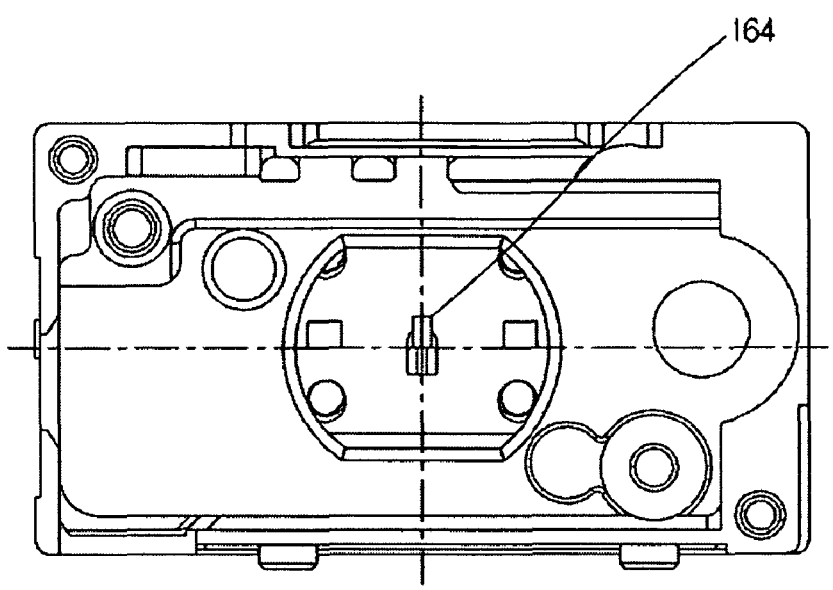

[Fig. 15]
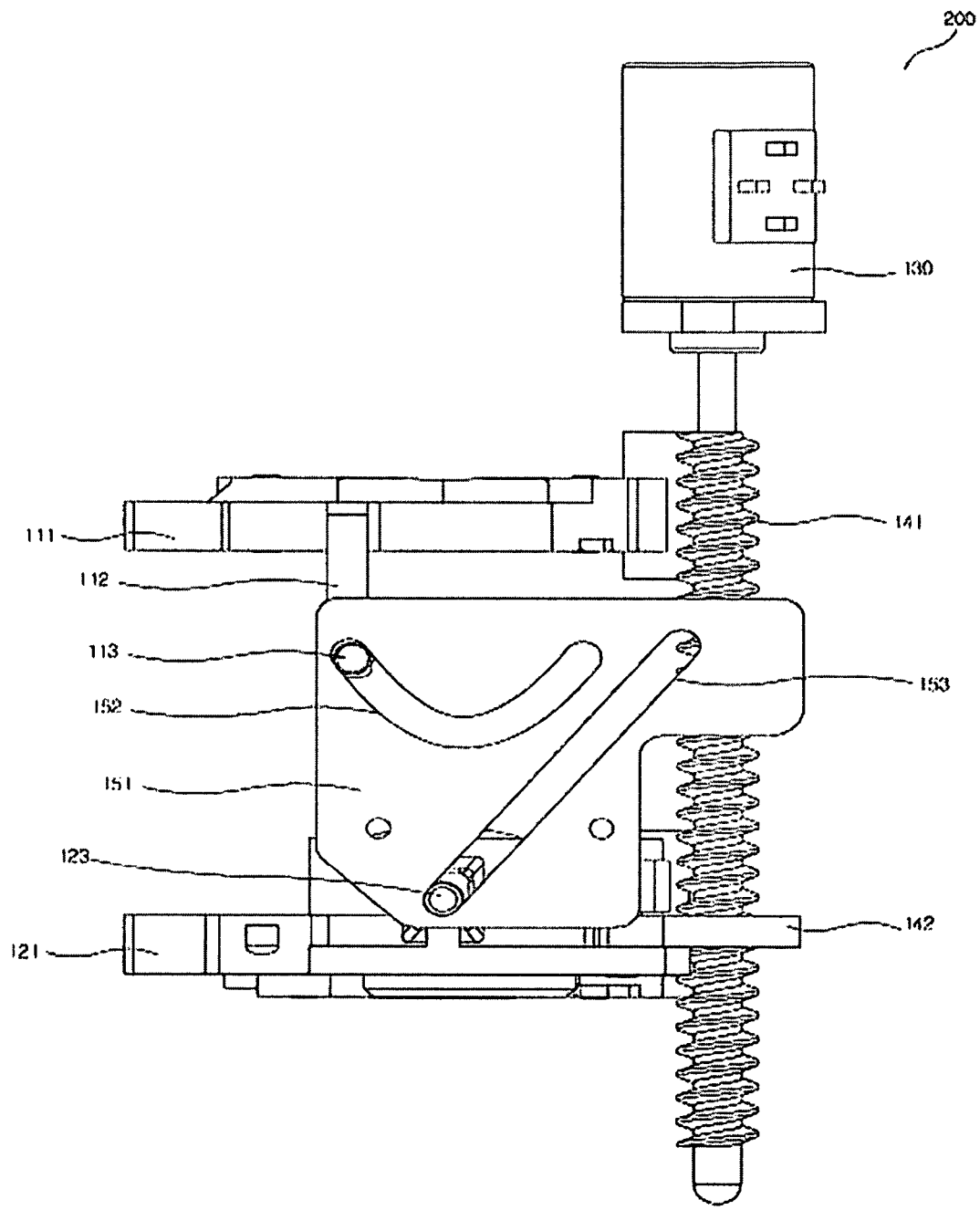

[Fig. 16]
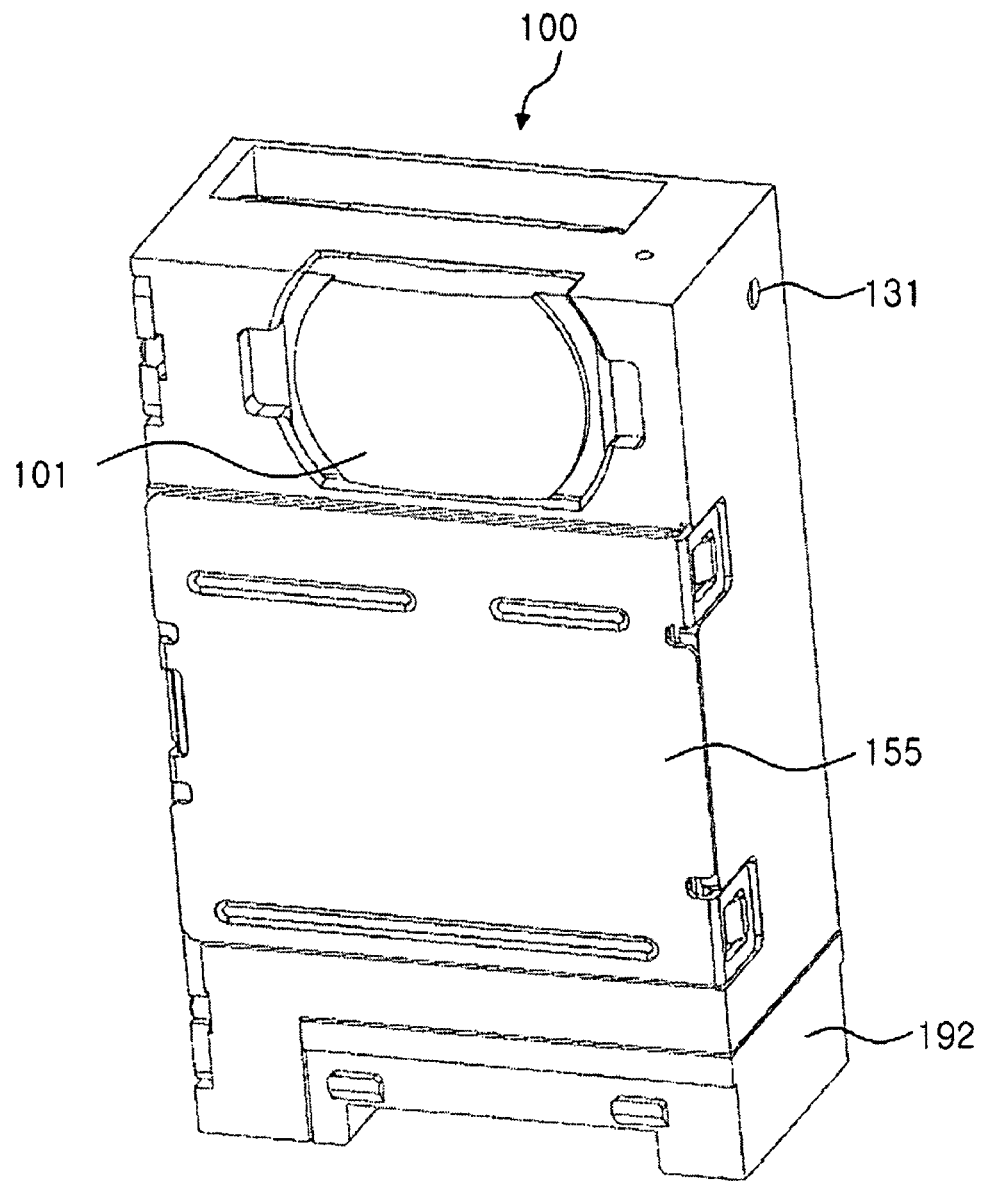

[Fig. 17]
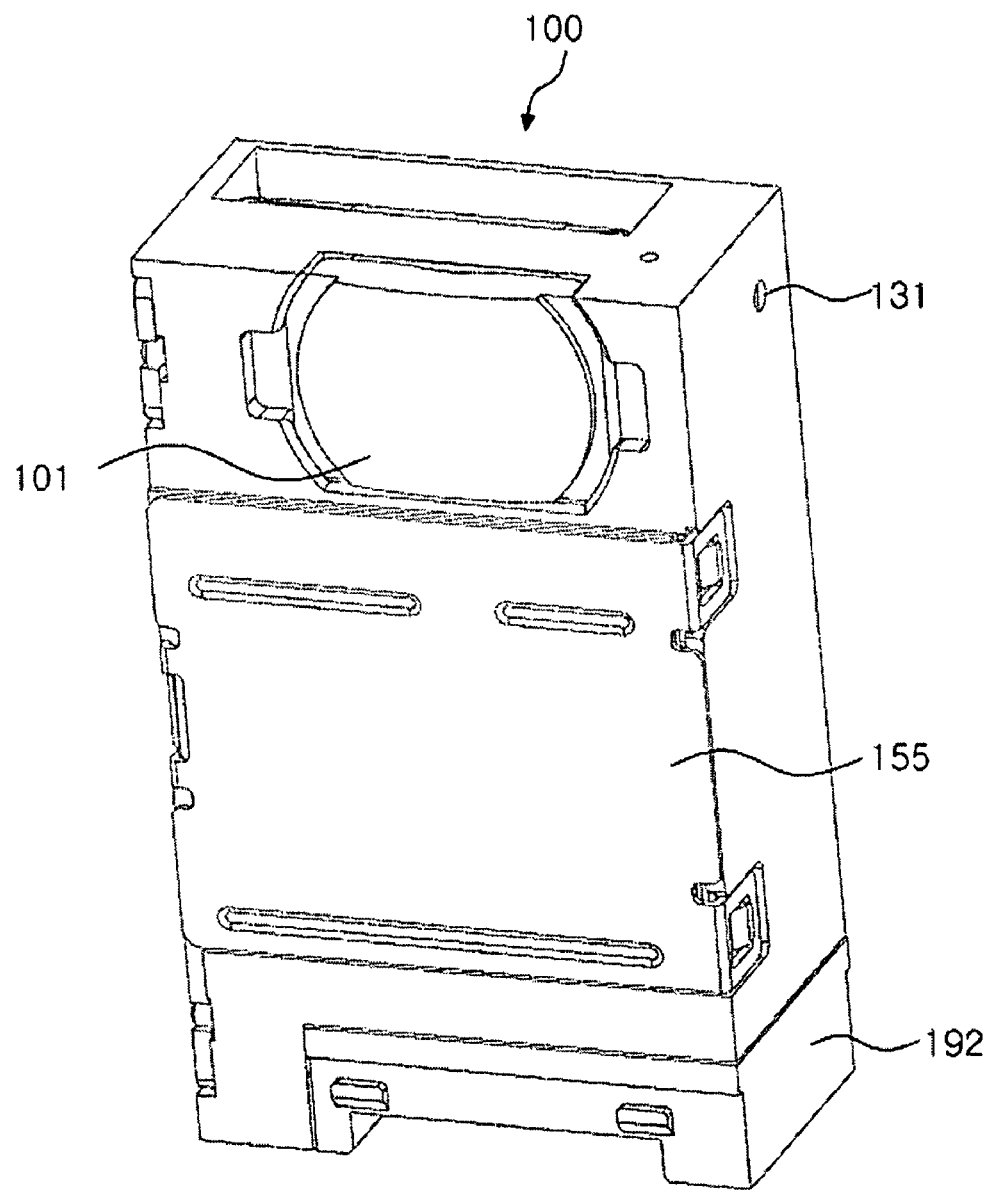

[Fig. 18]
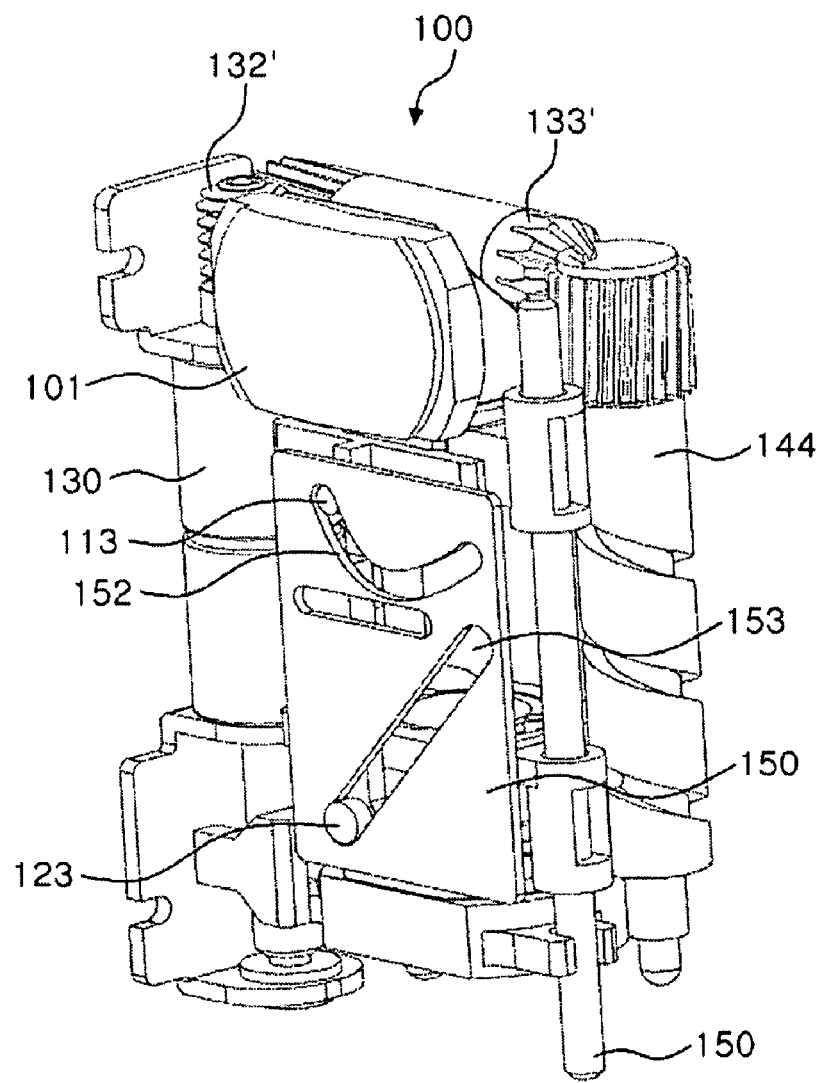

[Fig. 19]
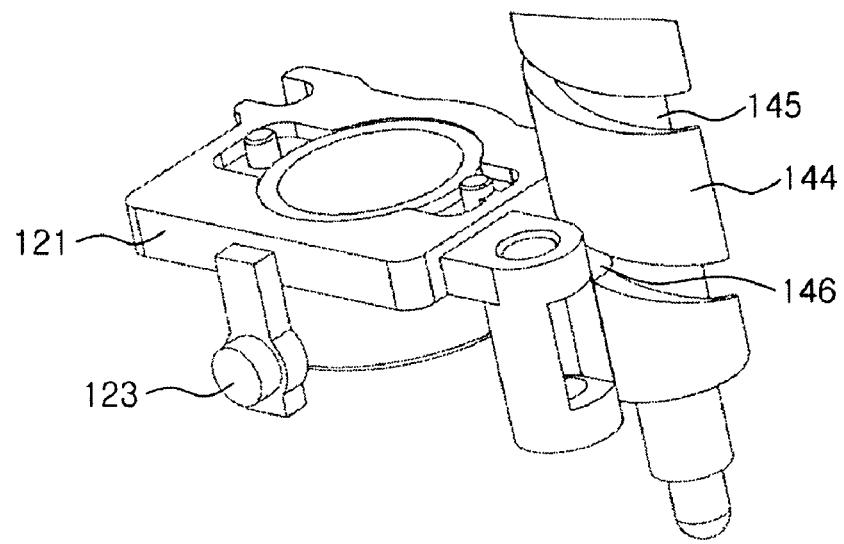
[Fig. 20]
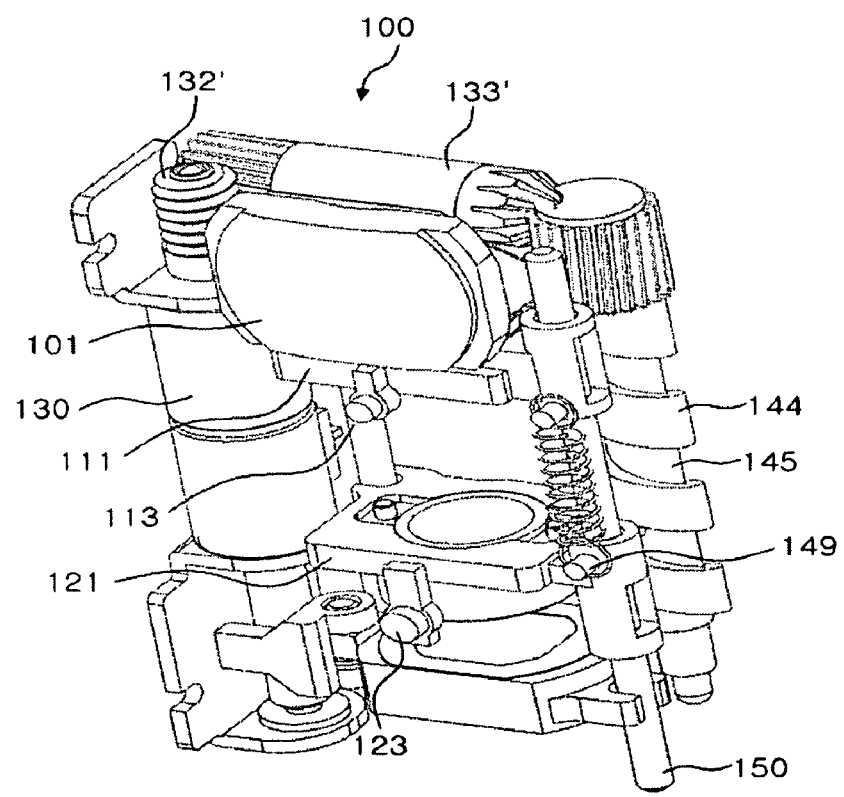

[Fig. 21]
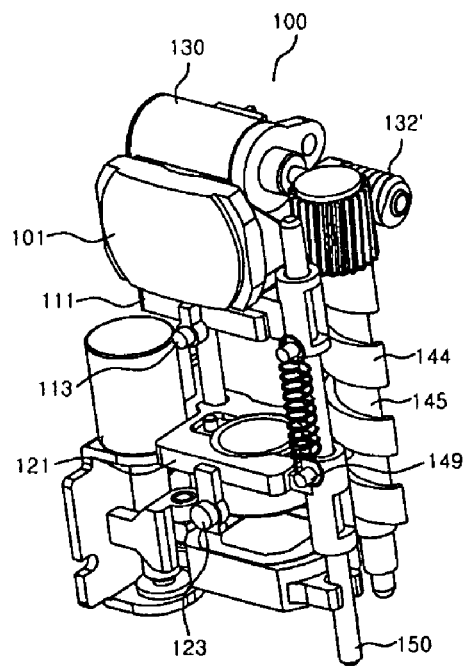
[Fig. 22]
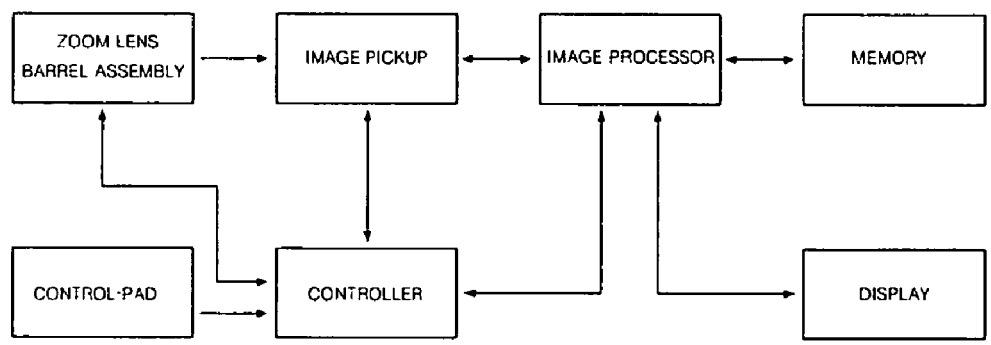

[Fig. 23]
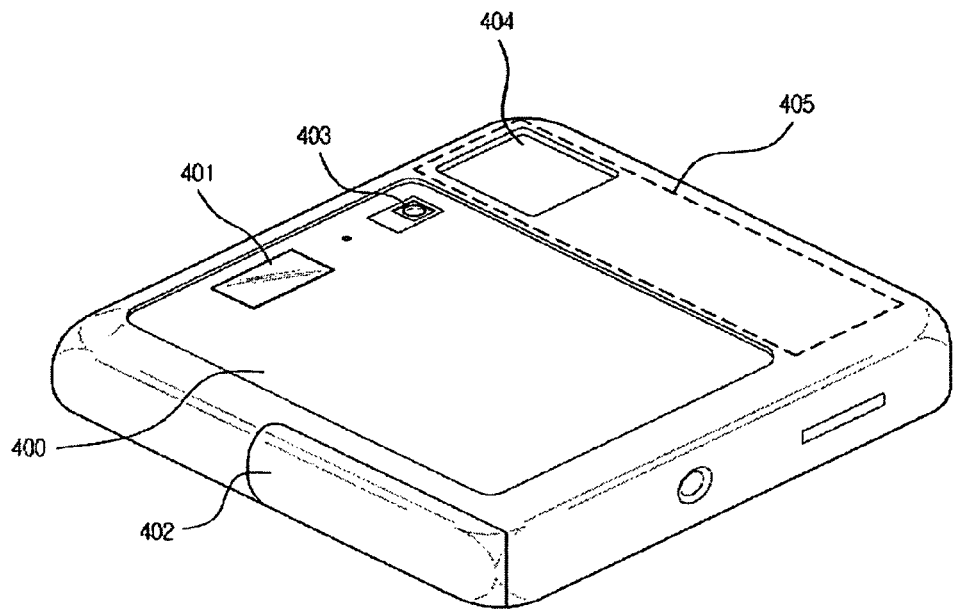
[Fig. 24]
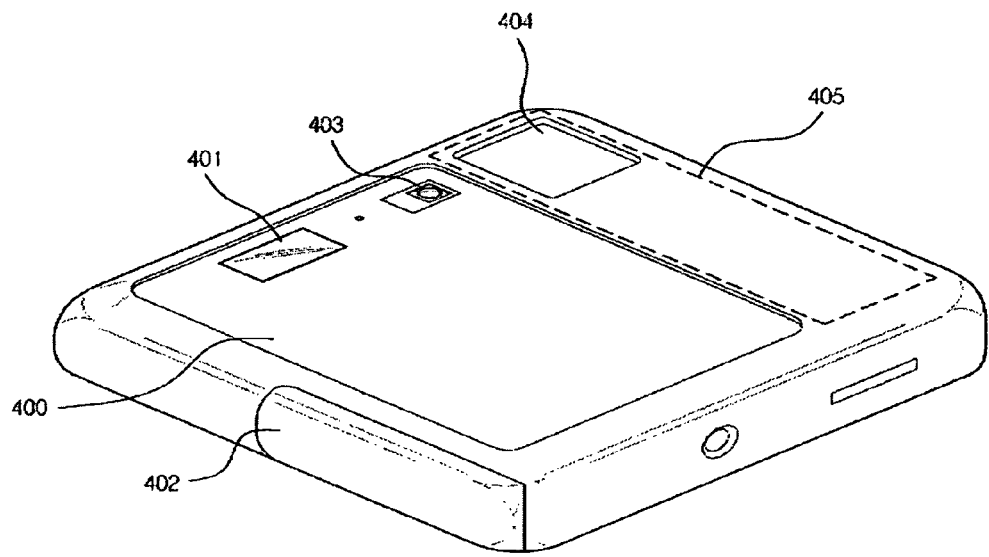

[Fig. 25]
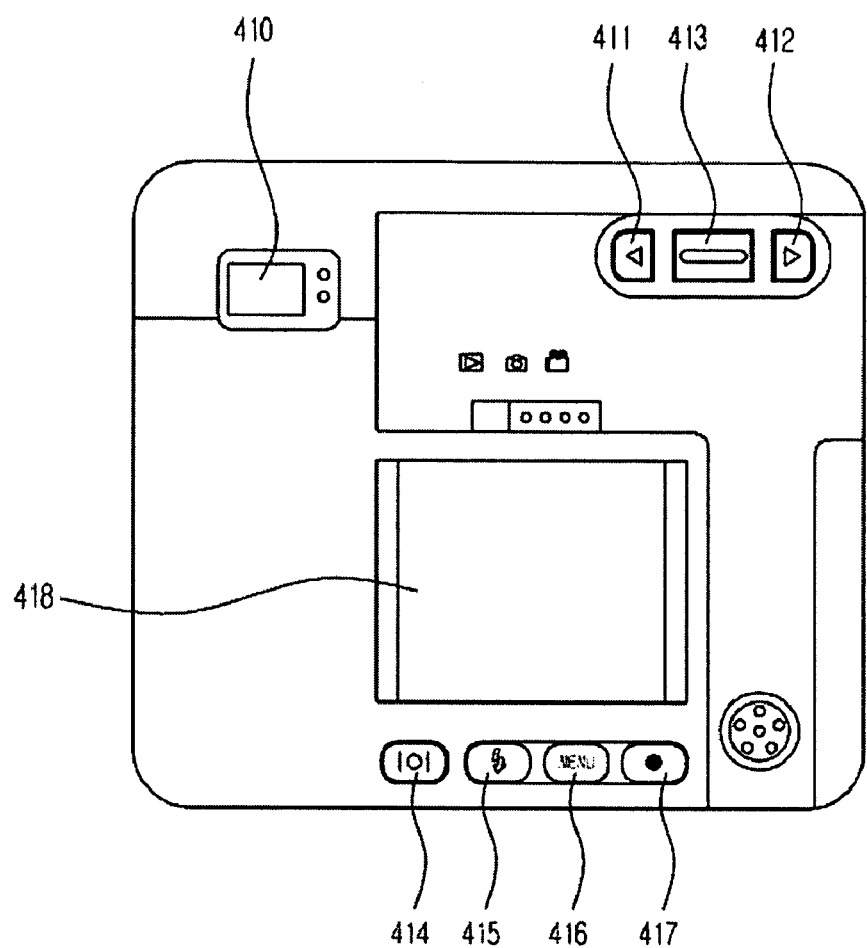

ZOOM LENS BARREL ASSEMBLY

CROSS-REFERENCE TO RELATED APPLICATIONS

This application is the U.S. national phase of the International Patent Application No. PCT/KR2007/007005 filed Dec. 31, 2007, which claims the benefit of Korean Application No. 10-2006-0137627 filed Dec. 29, 2006, the entire content of which is incorporated herein by reference, and Korean Application No. 10-2007-0134839 filed Dec. 21, 2007, the entire content of which is incorporated herein by reference.

BACKGROUND

The present invention relates to a zoom lens assembly. Various embodiments of the zoom lens assembly redirect image light entering from an object to perform zoom and focusing operations along a bent optical path, and more particularly, to a zoom lens assembly, which can stably endure external impacts, provide more precise zoom operation, stably operate for a long time without a malfunction of a zoom motor, which acts as a drive source, and improve space utilization inside a basic skeletal structure of a frame.

Various embodiments of the present invention relate to a zoom lens barrel assembly, which is mounted to a mobile device (e.g., a mobile phone or a personal digital assistant (PDA)) having a camera function, or to a digital camera, and an imaging apparatus having the zoom lens barrel assembly.

A digital imaging apparatus, such as a digital camera or a mobile phone camera, generally includes an optical system having a lens unit, an image pickup device disposed on one side of the lens unit, an image processor processing an electric signal, received from the image pickup device, and a memory storing a photographed image. The digital imaging apparatus operates as follows.

When a user takes a picture of an object, image light from the object enters an image pickup device, such as a charge coupled device (CCD) or a complementary metal oxide semiconductor (CMOS), through the lens unit, the image pickup device converts the incident image light into an image signal, the image processor processes the image signal, and the memory stores the image.

For user convenience, the digital imaging apparatus may include a zoom lens optical system for zooming in on an object that is located farther away than a typical position.

The zoom lens optical system performs a zoom operation, by having a mechanical construction that varies the distance between zoom lenses of the zoom lens optical system.

A conventional zoom lens optical system has a solid cam, formed on a cylindrical barrel, as a mechanical construction for changing the distance between zoom lens groups. However, it is difficult to machine the solid cam. In the zoom operation, the zoom lens groups move along the solid cam inside the barrel, thereby limiting the position of surrounding motors, such as a zoom motor and a focusing motor. There are problems in that efficient space utilization is difficult, and the overall size of the zoom lens barrel increases.

SUMMARY

The present invention has been made to solve the foregoing problems with the prior art, and therefore an object of the present invention is to provide a zoom lens barrel assembly for an imaging apparatus, which has a simple structure and allows efficient space utilization in order to provide a compact size, which is currently required in a mobile imaging apparatus, such as a digital camera or a mobile phone camera, and an imaging apparatus having the zoom lens barrel assembly.

Another object of the invention is to provide a zoom lens barrel assembly, which can stably endure external impacts, provide more precise zoom operation, and stably operate for a long time without a malfunction of a zoom motor, which acts as a drive source.

A further object of the invention is to provide a zoom lens barrel assembly, which can increase the rotation gain of a driving source and improve space utilization inside the basic skeletal structure of a frame by modifying the structure of a gear train, which cooperatively connects the driving source and a rotary cam member.

In various embodiments of the present invention, there is provided a zoom lens barrel assembly in an optical system, which has at least two zoom lens groups arranged on a first optical axis, the zoom lens barrel assembly changing the distance between the lens groups on the first optical axis to adjust the zoom ratio of the optical system. Various embodiments of the zoom lens barrel assembly include a zoom motor; a rotary drive member connected to one end of the zoom motor, the rotary drive member acting as a rotary driving source for moving the second zoom lens group according to the zoom ratio; at least one power transmission gear disposed between the zoom motor and the rotary drive member; a second zoom lens group member coupled with the rotary drive member, wherein the second zoom lens group member performs linear motion along the first optical axis, supports the second zoom lens group, arranged along the first optical axis, and has a second guide lug at one position thereof; a first zoom lens group member supporting the first zoom lens group arranged along the first optical axis, the first zoom lens group member having a first guide lug at one position thereof; a cam member having first and second cam slits, the first cam slit receiving the first guide lug, and the second cam slit receiving the second guide lug, wherein the cam member receives the driving force from the second zoom lens group through the second cam slit and slides across the first optical axis, thereby transmitting the driving force to the first zoom lens group member through the first cam slit while causing a change in the distance between the first and second zoom lens group members, and at least one of the first and second cam slits is U-shaped; a cam cover disposed outside the cam member; and a frame, with which the cam cover may be coupled to prevent the cam member from being released. The zoom motor may be placed in front of a reflective optical device about the first optical axis, and a portion of a rotary shaft of the zoom motor protruding beyond the rotary shaft may be rotatably inserted into a hole of the frame.

The rotary drive member may include a screw member, which is rotated by the driving force from the zoom motor, and a clip member, which converts the rotation of the screw member into linear motion.

The rotary drive member may include a rotary cam member, which has a groove formed in the surface of a circular column, wherein the rotary cam member is rotated by driving force from the zoom motor to reciprocally move the second zoom lens group member along the first optical axis.

The inclination of the groove in the rotary cam member may vary along the axial length of the rotary cam member, so that the speed with which the zoom lens moves varies along the axial length.

The zoom lens barrel assembly may further include an elastic member disposed between the first and second zoom lens groups, the elastic member expanding or contracting according to the zoom ratio.

The power transmission gear may include a worm gear, which is coupled with the rotary shaft of the zoom motor, and a worm wheel or a bevel gear, which is rotatably meshed with the worm gear.

The zoom lens barrel assembly may further include the reflective optical device, which is disposed, around the first zoom lens group facing an object along the first optical axis, thereby converting a path of incident light, introduced along a second optical axis crossing the first optical axis, toward the first optical axis; and a fixed lens group, which is disposed around the reflective optical device facing the object along the second optical axis opposite the object, wherein image light introduced from the object sequentially passes through the fixed lens group, the reflective optical device, the first zoom lens group and the second zoom lens group.

The zoom lens barrel assembly may further include a third zoom lens drive motor; and a third zoom lens group driven by the third zoom lens drive motor, and cooperating with the first zoom lens group and the second zoom lens group along the same optical axis as the first zoom lens group and the second zoom lens group, wherein the third zoom lens group is disposed around the second zoom lens facing an image, and moves in a direction reverse to that of the second zoom lens group, thereby enabling a focusing operation according to the zoom ratio.

The zoom motor and the rotary drive member may be arranged parallel to the first optical axis.

As set forth above, various embodiments of the zoom lens barrel assembly of the invention are devised to solve at least some of the problems with the conventional zoom lens barrel, which has the solid cam. Various embodiments of the zoom lens barrel assembly adopt a zoom lens driving mechanism having a simple structure, and thus can reduce manufacturing costs owing to its improved design, ease of processing, and ease of assembly while efficiently utilizing space, thereby providing a compact size, which is currently required in a mobile imaging apparatus such as a digital camera or a mobile phone camera.

Furthermore, in the zoom lens barrel assembly of various embodiments of the invention, driving force from the zoom motor may be transmitted to the second zoom lens group member through the rotary cam member, and the driving force may be transmitted from the second zoom lens group member to the first zoom lens group member through the cam member, so that the distance between the first and second zoom lens groups may be varied according to the zoom operation. The elastic member may be connected between respective zoom lens groups, the rotary cam member may be rotated by a fixed amount of power, and the zoom lens group, performing linear motion along the optical axis in cooperation with the rotary cam member, may have different interval velocities. Accordingly, various embodiments of the zoom lens barrel assembly can stably endure external impacts, provide more correct zoom operation, and optimize the operation time and the number of rotations of the rotary cam member, so that the zoom motor, acting as a driving source, can be stably operated for a long time.

Moreover, various embodiments of the zoom lens barrel assembly of the invention can increase the rotation gain of a driving source and improve space utilization inside the basic skeletal structure of a frame by modifying the structure of the gear train, which cooperatively connects the driving source and a rotary cam member.

BRIEF DESCRIPTION OF THE DRAWINGS

FIG. 1 is a schematic perspective view of a zoom lens barrel assembly according to a first embodiment of the present invention;

FIG. 2 is a cross sectional view taken along the line A-A of FIG. 1;

FIG. 3 is a perspective view of the zoom lens barrel assembly shown in FIG. 1, from which the frame is detached;

FIG. 4 is an exploded perspective view of the zoom lens barrel assembly shown in FIG. 1;

FIG. 5 is a front elevation view of the zoom motor, a gear train, a screw, a clip and a cam member of the zoom lens barrel assembly shown in FIG. 1, in which the zoom lens barrel is positioned at a wide end;

FIG. 6 is a side elevation view of FIG. 5;

FIG. 7 illustrates the zoom lens barrel of FIG. 2, displaced to a middle end;

FIG. 8 illustrates the zoom lens barrel of FIG. 2, displaced to a tele end;

FIGS. 9 and 10 are assembled and exploded views of the screw member, the clip member and the second lens group member of the zoom lens barrel assembly of FIG. 2;

FIG. 11 is a rear perspective view illustrating the construction of the zoom motor of the zoom lens barrel assembly of FIG. 2;

FIG. 12 is a cross sectional view taken along the center of the zoom motor of FIG. 11;

FIG. 13 illustrates the frame member of the zoom lens barrel assembly of FIG. 2, seen along the second optical axis;

FIG. 14 illustrates the frame member of the zoom lens barrel assembly of FIG. 2, seen along the first optical axis;

FIG. 15 is a perspective view of a zoom lens barrel assembly according to another embodiment of the present invention;

FIG. 16 is a schematic perspective view of the zoom lens barrel assembly according to the second embodiment of the present invention;

FIG. 17 is a cross sectional view taken along the line AA' of FIG. 16;

FIG. 18 is a perspective view, in which the frame of FIG. 16 is removed;

FIG. 19 is a perspective view of a coupling-cooperating structure of the rotary cam member and the second zoom lens group member of FIG. 16;

FIG. 20 is a perspective view, in which the sliding cam member of FIG. 18 is removed;

FIG. 21 is a perspective view, in which the gear train of FIG. 20 is modified;

FIG. 22 is a block diagram illustrating the construction of an example of a digital imaging apparatus, to which an embodiment of the zoom lens barrel assembly of the present invention is mounted;

FIG. 23 is a perspective view of a digital imaging apparatus, which has an embodiment of the zoom lens barrel assembly of the present invention mounted therein;

FIG. 24 is an inside view of a camera including an inner circuit, on which the components of FIG. 23 are formed, and other components;

FIG. 25 is a rear elevation view of the digital pickup device of FIGS. 23 and 24.

DETAILED DESCRIPTION OF THE EMBODIMENTS

Hereinafter, embodiments of a zoom lens barrel assembly of the present invention will be described more fully with reference to the accompanying drawings, in which exemplary embodiments thereof are shown.

Below, a detailed description will be made of a first embodiment of the present invention with reference to the accompanying drawings.

FIG. 1 is a schematic perspective view of a zoom lens barrel assembly according to a first embodiment of the present invention, FIG. 2 is a cross sectional view taken along the line A-A of FIG. 1, FIG. 3 is a perspective view of the zoom lens barrel assembly shown in FIG. 1, from which the frame has been detached, and FIG. 4 is an exploded perspective view of the zoom lens barrel assembly shown in FIG. 1.

In the first embodiment, a rotary drive member includes a screw and a clip, which will be detailed later.

Referring to FIGS. 1 to 4, the zoom lens barrel assembly includes a first zoom lens group member 111, a second zoom lens group member 121, a zoom motor 130, a screw member 141, a clip member 142, a cam member 151, a fixed lens group 101, a reflective optical device 102 and frames 190 and 192. As an alternative, the zoom lens barrel assembly may be constructed without the fixed lens group member 101 and the reflective optical device 102, so that image light from an object can be directly introduced in a first optical axis direction.

First, a description will be made of the first zoom lens group member 111, the second zoom lens member 121, the zoom motor 130 and the cam member 151, which realize a zoom operation. In the shown zoom lens assembly structure having the fixed lens group 101 and the reflective optical device 102, a second optical axis OP2 is directed toward the object, and a first optical axis OP1 crosses the second optical axis OP2 while extending through a first zoom lens group 103 and 104 and a second zoom lens group 105, 106 and 107. The image light from the object sequentially passes through the fixed lens group 101, the reflective optical device 102, the first zoom lens group 103 and 104, and the second zoom lens group 105, 106 and 107 before entering an image sensor (e.g., a charge coupled device (CCD) or a complementary metal oxide semiconductor (CMOS))).

The first zoom lens group 103 and 104 includes at least one lens, and is arranged along the first optical axis OP1. The first zoom lens group member 111 surrounds the first zoom lens group 103 and 104, thereby supporting the same.

The first zoom lens group member 111 is provided, at one side thereof, with a first guide rib 112 (see FIG. 3) having a first guide lug 113. The first guide lug 113 is formed on one end of the first guide rib 112, in the direction in which the cam member 151 is mounted. The cam member 151 is assembled to the frames 190 and 192, in such a fashion that the first guide lug 113 is inserted into a first cam slit 152 and a second guide lug 123 is inserted into a second cam slit 153. A cam cover 155 (see FIGS. 1 and 4) is fixedly assembled to the frames 190 and 192 with the cam member 151 interposed therebetween, so that the cam member 151 is fixed. The cam cover 155 is located outside the cam member 151 and is assembled to the frame 190, thereby preventing the cam member 151 from being released from the assembly.

According to this embodiment, the first zoom lens group member 111 has the first guide rib 112, which has the first guide lug 113. However, this is not intended to limit the embodiments of present invention. As an alternative, the first zoom lens group member 111 may not have the first guide rib 112, and the first guide lug 113 may be formed directly on the first zoom lens group member 111.

The second zoom lens group member 121 is spaced apart from the first zoom lens group member 111 along the first optical axis OP1. The second zoom lens group 105, 106 and 107 includes at least one lens, and is arranged along the first optical axis OP1, and the second zoom lens group member 121 surrounds the second zoom lens group 105, 106 and 107, thereby supporting the same.

The second zoom lens group member 121 is provided, at one side thereof, with a second guide rib 122. The second guide lug 123 is formed on one end of the second guide rib 122, in the direction in which the cam member 151 is mounted.

According to this embodiment, the second zoom lens group member 121 has the second guide rib 122, which has the second guide lug 123. However, this is not intended to limit the embodiments of the present invention. As an alternative, the second zoom lens group member 121 may not have the second guide rib 122, and the second guide lug 123 may be formed directly on the second zoom lens group member 121.

The zoom motor 130 acts to provide power in order to change the distance between the first zoom lens group member 111 and the second zoom lens group member 121. The zoom motor 130 is placed in front of the reflective optical device 102 on the basis of the first optical axis OP1, and the rotary shaft 131 of the zoom motor 130 is oriented parallel to the second optical axis OP2.

The rotary shaft 131 is integrally assembled to the zoom motor 130, in which, as a structural feature, one end of the rotary shaft 131 protrudes out beyond a zoom gear 132. In this structure, the zoom motor rotary shaft 131 is rotatably inserted into a zoom motor rotary shaft hole 191 in the frame 190, so that the end of the rotary shaft 131 is supported by the hole 191 during the rotation of the zoom motor 130, thereby reducing vibration and thus noise. This also makes it possible to prevent the rotary shaft 131 from being bent by an external drop impact, thereby improving the ability of the driving mechanism to withstand external impacts, which occur when a consumer uses the assembly.

A gear train including 132 and 133 transmits a driving force from the zoom motor 130 to the screw member 141. The driving force from the zoom motor 130 rotates the screw member 141, which in turn transmits the driving force to the clip member 142. Rotational force from the screw member 141 causes the clip member 142 to rotate, but the clip member 142 is guided by a clip guide shaft 143 to perform linear motion. Then, the clip member 142 drives the second zoom lens group member 121 to perform linear motion along the first optical axis OP1. The second zoom lens group member 121 is provided, at one side thereof, with the second guide rib 122 having the second guide lug 123. The guide lug 123 is formed on one end of the second guide rib 122, in the direction in which the cam member 151 is mounted. The second guide lug 123 performs linear motion along the first optical axis OP1, thereby causing the cam member 151 to slide.

The cam member 151 of this embodiment is shaped as a plate, and has the first and second cam slits 152 and 153 formed in the central portion thereof. While the cam member 151 of this embodiment has a planar plate-like structure, this is not intended to limit the embodiments of the present invention. That is, in various embodiments of the present invention, the cam member can be provided in various shapes. For example, the cam member can have a curved surface rather than a planar surface, according to the usage of the present invention. A normal to the plane of the cam member 151 is directed toward the object to be photographed, thereby minimizing the volume of the zoom lens barrel.

The first cam slit 152 is formed in a shape such that the first guide lug 113 can be inserted into and slide along the cam slit 152.

The second cam slit 153 is formed in a shape such that the second guide lug 122 is inserted thereinto, thereby receiving driving force from the second zoom lens group member 111.

In this embodiment, the first cam slit 152 has a U-shaped configuration, and the second slit 153 is linearly shaped. However, these features are not intended to limit the embodiments of the present invention. That is, the shape of the first and second cam slits 152 and 153 of the present invention should allow proper adjustment of the sliding amount of the cam member 151 and the distance between the first zoom lens group member 111 and the second zoom lens group member 121 in order to carry out a zoom operation. However, no specific shapes are required for the first and second cam slits 152 and 153.

Accordingly, a designer determines variation in the distance between the first zoom lens group member 111 and the second zoom lens group member 121 and determines the curvature and shape of the first and second cam slits 153 according to the variation. As an alternative structure, the optical position of the second zoom lens group member 121 may be determined directly by the number of rotations of the screw member 141, and the optical distance between the first and second zoom lens group members 111 and 121 may be determined by the first cam slit 152 of the cam member 151.

A third zoom lens group member 180 is placed below the zoom lens barrel of this embodiment, that is, around the second zoom lens group member 121 facing an image, along the first optical axis OP1.

The third zoom lens group member 180 has a third zoom lens group 108, and, in a zoom operation, a third zoom lens group drive motor 181 causes the third zoom lens group member 180 to move by a preset value. The third zoom lens group 108 simultaneously performs an automatic focusing operation. In this case, the second zoom lens group member 121 and the third zoom lens group member 180 move in opposite directions when the zoom operation is carried out from a tele end to a wide end.

While this embodiment is provided with the third zoom lens group member 180, which carries out the zoom and automatic focusing operations, separately from the first and second zoom lens group members 111 and 121, this is not intended to limit the embodiments of the present invention. In various embodiments of the present invention, the zoom operation may be enabled by only the first and second zoom lens members 111 and 121, in which case the third zoom lens member 180 remains stationary.

Two guide shafts 171 and 172 are mounted to the frames 190 and 192 in a direction parallel to the first optical axis OP1, thereby forming a symmetrical arrangement. The guide shafts 171 and 172 guide the first and second zoom lens group members 111 and 121 to move along the first optical axis OP1.

FIG. 5 shows the zoom lens barrel at a wide end, FIG. 7 shows the zoom lens barrel at a middle end, and FIG. 8 shows the zoom lens barrel at a tele end. FIG. 6 is a side elevation view of FIG. 5. The movement of the first zoom lens group 111 and the second zoom lens group 121, from the tele end (FIG. 5) via the middle end (FIG. 7) to the tele end (FIG. 9), is realized by the following power transmission structure: the zoom motor 130→a worm gear 132→a worm wheel 133→the screw member 141→the clip member 142→the second lens group member 121→the second guide lug 123→the second cam slit 153→the cam member 151→the first cam slit 152→the first guide lug 113→the first guide rib 112→the first lens group member 111.

Below, a detailed description will be made of an embodiment of a process of operating the zoom lens barrel using a driving force transmitted from the zoom motor 130 to the cam member 151, with reference to FIGS. 3, 9 and 10.

The worm gear 132 is inserted into the rotary shaft 131 of the zoom motor 130. The worm wheel 133 is disposed to mesh with the worm gear 132 and cross the direction of the rotary shaft 131 of the zoom motor 130.

The screw member 141 is press fitted into the shaft of the worm wheel 133, and has a lead screw integrally formed therein, which can convert each rotation of the zoom motor 130 into a preset amount of movement.

Referring to FIGS. 3, 9 and 10, the clip member 142 assembled to the screw member 141 is provided with a lead screw, which is shaped to mate with the lead screw of the screw member 141. Desirably, a separate key hole 144 (see FIG. 10) is formed in the clip member 142, and is fitted around the clip guide shaft 143, so that the clip member 142 converts rotation into linear motion.

Referring to FIGS. 3 and 10, the clip member 142, after performing conversion into linear motion, causes the second zoom lens group member 121 to linearly move along the first optical axis OP1. Here, the second guide lug 123 of the second zoom lens group member 121 transmits the driving force to the cam member 151.

When the driving force is transmitted from the second guide lug 123, the cam member 151 is biased to perform rotation or linear motion along the first optical axis OP1 due to components of force since the second slit 153 is inclined at a preset angle about the first optical axis OP1. However, cam member guides 161 and 162 (see FIGS. 4 and 13) of the frame member 190 cause the cam member 151 to slide along the first optical axis OP1.

When the driving force is transmitted from the rotary shaft 131 of the zoom motor 130 to the cam member 151 through the screw member 141, the clip member 142, and the second zoom lens group member 121, the cam member 151 slides in the direction of the arrow B. Then, the first guide lug 113 slides along the first cam slit 152 to change the distance between the first zoom lens group member 111 and the second zoom lens group member 121, thereby enabling the zoom operation.

FIG. 11 is a rear perspective view illustrating the construction of the zoom motor of the zoom lens barrel assembly of FIG. 2, and FIG. 12 is a cross sectional view taken along the center of the zoom motor of FIG. 11.

Referring to FIGS. 11 and 12, the motor rotary shaft 131 is integrally assembled with the zoom motor 130. As a structural feature, the distal end of the zoom motor rotary shaft 131 protrudes beyond the zoom gear 132. With this feature, the distal end 13 of the zoom motor rotary shaft 131 is rotatably inserted into the zoom rotary shaft hole 191 formed in one portion of the frame 190, so that the rotary shaft 131 of the zoom motor 130 is supported by the hole 191, thereby reducing vibrations and thus noise. This also makes it possible to prevent the rotary shaft 131 from being bent by an external drop impact, thereby improving the ability of the driving mechanism to withstand external impacts, which occur when a consumer uses the assembly.

The frame 190 is also provided with measurement guides 163 and 164, which can be observed along the first optical axis OP1 and the second optical axis OP2, and can thus be used to measure the orthogonality between the first and second optical axes OP1 and OP2. That is, it is difficult to identify the center of the second optical axis OP2 when seen along the first optical axis OP1 or the center of the first optical axis OP1 when seen along the second optical axis OP2. As a method of measuring the center of the first optical axis OP1 and the center of the second optical axis OP2, the center of the second optical axis OP2, which can be measured along the first optical axis OP1, is formed, and the center of the first optical axis OP1, which can be measured along the second optical axis OP2, is formed. Accordingly, both the centers of the first and second optical axes OP1 and OP2 can be measured.

As described above, the zoom lens barrel of this embodiment can be easily designed or manufactured through an easy fabrication or assembly process while efficiently utilizing space, thereby making a thin imaging apparatus.

FIG. 15 is a perspective view of a zoom lens barrel assembly 200 according to another embodiment of the present invention, in which the gears 133 and 132 are omitted from the zoom driving mechanism, and the screw member 141 is directly connected to the zoom motor 130. This embodiment of FIG. 15 is different in the overall shape compared to the embodiment of FIGS. 1 to 14, which is caused by the difference in length along the first optical OP1 between the worm wheel 133 and the zoom motor 130.

Below, a second embodiment of the present invention will be described with reference to FIGS. 16 to 21.

FIG. 16 is a schematic perspective view of the zoom lens barrel assembly according to the second embodiment of the present invention, FIG. 17 is a cross sectional view taken along the line AA' of FIG. 16, FIG. 18 is a perspective view, in which the frame of FIG. 16 is removed, FIG. 19 is a perspective view of a coupling-cooperating structure of the rotary cam member and the second zoom lens group member of FIG. 16, FIG. 20 is a perspective view, in which the sliding cam member of FIG. 18 is removed, and FIG. 21 is a perspective view, in which the gear train of FIG. 20 is modified.

Desirably, measurement guide holes (not shown), for measuring the orthogonality of the first and second optical axes OP1 and OP2, are formed in outer portions of the frames 190 and 192, which form the basic skeletal structure including all of the aforementioned components.

Of course, the zoom lens barrel assembly 100 of various embodiments of the present invention also includes the third zoom lens group 108, which adjusts the focus of image light. It is desired that the third zoom lens group 108 be placed on the first optical axis OP1, between the first and second zoom lens groups 103 to 107 and an image sensor (not shown).

Other components, such as the frame and the cam cover, which may have the same construction as in the first embodiment, will not be described in detail.

In the second embodiment, the rotary drive member includes a rotary cam member. Below, a description will be made of the operation of the rotary drive member of the second embodiment and assembly components, which cooperate with the rotary drive member.

The first zoom lens group has the first guide lug 113, which protrudes from the outer surface thereof. The first guide lug 113 supports the first zoom lens group 103 and 104, including at least one lens arranged on the first optical axis OP1.

The second zoom lens group has the first guide lug 113 and a rotary cam boss 146, which protrude from the outer surface thereof in different directions. The first guide lug 113 and a rotary cam boss 146 support the second zoom lens group 105 and 107, including at least one lens, arranged on the first optical axis OP1.

Here, the rotary cam boss 146 is inserted into a groove 145 in the rotary cam member 144, which will be described later with reference to FIG. 19, so that the second zoom lens group is coupled with and cooperates with the rotary cam member 144.

The first and second guide lugs 113 and 123 are directly formed on the first and second zoom lens groups to protrude in the direction in which the cam member 151 is mounted. The first and second guide lugs 113 and 123 may be indirectly formed through first and second guide ribs, each of which extends from a corresponding one of the first and second zoom lens groups, according to the positional relationship with the cam member 151.

A guide rail 150 guides the first and second zoom lens groups, by limiting the courses thereof, so that the first and second zoom lens groups reciprocally move along the first optical axis OP1. For example, the guide rail 150 may include two rods, which are arranged parallel to the first optical axis OP1, and on which the first and second zoom lens groups are mounted.

While the two rods of the guide rail 150 are shown in the drawings, this feature is not intended to limit the embodiments of the present invention. Of course, the number of rods can vary, as long as the first and second lens groups are not inclined.

The zoom motor 130, acting as a driving source, rotates the rotary cam member 144, in conjunction with a worm gear 132' and a bevel gear 133'.

For example, the worm gear 132' is directly coupled with the driving source 130, and the bevel gear 133' is directly coupled with the rotary cam member 144, so that the driving force from the driving source 130 can be sequentially transmitted through the worm gear 132', the bevel gear 133' and the rotary cam member 144.

Here, two shafts of the worm gear 132' and the bevel gear 133' cross each other, so that the shaft of the driving source 130 and the rotary shaft of the rotary cam member 144 are arranged parallel to the first optical axis OP1, and the shaft of the bevel gear 133' is arranged across the first optical axis OP1. Accordingly, the driving source 130, the worm gear 132', the bevel gear 133' and the rotary cam member 144 form a U-shaped configuration.

In addition, since the reflective optical device 102 is shaped as a prism, the bevel gear 133' is disposed in the remaining space outside the reflecting surface of the prism. Desirably, the shaft of the bevel gear 133' is arranged to cross the first and second optical axes OP1 and OP2.

Furthermore, the shafts of the worm gear 132' and the bevel gear 133' are rotatably inserted into shaft holes (not shown) in the frame 190, thereby preventing the driving source 130 and the gear train from being released in the event of an external impact.

The transmission ratio of the bevel gear 133' is generally one (1), meaning that the transmission ratio of the worm gear 132' is identical with the transmission ratio of the bevel gear 133'. This does not limit the embodiments of the present invention, and the transmission ratio of the bevel gear 133' can be varied in order to increase the rate of rotation of the driving source 130.

The cam member 151 is driven by a driving force, in response to the reciprocal movement of the second zoom lens group, to slide across the first optical axis OP1, thereby transmitting the driving force to the first zoom lens group. The cam member 151 has the first and second cam slits 152 and 153, each of which receives a corresponding one of the first and second guide lugs 113 and 123, for exchange of power with the first and second zoom lens groups.

Desirably, the first and second cam slits 152 and 153 are shaped in such a fashion that the distance between the cam slits changes non-linearly as the cam member 151 slides.

For example, the first cam slit 152 can be formed in a U shape, and the second cam slit 153 can be formed in a straight line, inclined about the first optical axis OP1.

As described above, the cam member 151 is similar to the conventional art, in that the first and second cam slits 152 and 153 cause a change in the distance between the first and second zoom lens groups, but is distinct from the conventional art in the power transmission structure thereof. That is, the cam member 151 is not the subject that transmits the driving force to the first and second zoom lens groups, but acts as a power transmission medium between the first and second zoom lens groups.

In the conventional art, driving force from the zoom motor, acting as a driving source, is simultaneously transmitted to the first and second zoom lens groups through the cam member. In various embodiments of the present invention, driving force from the driving source is transmitted to the second zoom lens group through the rotary cam member 144, and at the same time, is transmitted to the first zoom lens group through the cam member 180. It is apparent that the power transmission path of various embodiments of the present invention is different from that of the conventional art.

As shown in FIG. 19, the rotary cam member 144 has the groove 145 formed in the surface of a circular column. When the rotary cam member 144 is rotated by a driving force from the zoom motor 130, the rotary cam boss 146 reciprocally moves along the groove 145 in a plane parallel to the first optical axis OP1, thereby moving the second zoom lens group, with which the rotary cam boss 144 is integrated.

When the rotary cam member 144 is rotated, the rotary cam boss 146, inserted into the groove 145 in the rotary cam member 144, moves along the first optical axis OP1 in the groove 145, thereby acting as a follower that receives the driving force from the rotary cam member 144.

The groove 145 in the rotary cam member 146 is an important technical feature of the present invention. The groove 145 may be formed as a spiral, which has a specific inclination along the entire axial length thereof. Desirably, the groove may have different inclinations that vary along the axial length.

That is, when the rotary cam member 144 is rotated at a specific speed by the driving force from the zoom motor 130, the interval velocity of the rotary cam boss 146 moving along the first optical axis OP1 in the groove 145 can vary along the axial length of the groove, thereby variably adjusting the speed of the second zoom lens group according to the sections of a stroke.

A specific section of the groove 145 of the rotary cam member 144 can be configured to have a lower inclination when this section of the groove 145 corresponds to a zooming section, which requires higher precision. Then, the second zoom lens group can locally decelerate while the driving force of the zoom motor 130 remains constant.

As a result, correct zoom operation can be realized, and the operation time and the number of rotations of the rotary cam member 144 according to the zoom operation are optimized, so that the zoom motor 130 can stably operate for a long time.

Desirably, as shown in FIG. 20, the zoom lens barrel assembly of various embodiments of the present invention also includes an elastic member 149, which is positioned between the first and second zoom lens groups and expands/contracts according to the zoom operation.

The elastic member 149 contracts when the distance between the first and second zoom lens groups 111 and 121 decreases, but expands when the distance increases, so that the first and second zoom lens members 111 and 121 can move in precise and close contact with respective first and second cam slits 151 and 152.

The elastic member 149 can contract and thus absorb external impacts, thereby preventing the first and second zoom lens group members 111 and 121 from being released and the first and second cam slits 151 and 152 from being damaged. After the impact, the elastic member 149 returns to its original position due to its restoring force. As a result, the elastic member 149 can prevent products in the market from deteriorating.

As shown in FIG. 21, in the zoom lens barrel assembly 100 of various embodiments of the present invention, the gear train, by which the zoom motor 130 and the rotary cam member 144 cooperate with each other, can be implemented with the worm gear 132' alone.

Here, since the reflective optical device 102 is shaped as a prism, the zoom motor 130 is disposed in the remaining space outside the reflecting surface of the prism, and thus the shaft of the zoom motor 130 is arranged to cross the first and second optical axes OP1 and OP2.

Below, the construction of a device, to which the zoom lens barrel assembly according to the first and second embodiment may belong, will be described in brief.

FIG. 22 is a block diagram illustrating the construction of an example of a digital imaging apparatus, to which the zoom lens barrel assembly of various embodiments of the present invention may be mounted. The digital imaging apparatus includes the zoom lens barrel assembly 300 of the present invention, an image pickup 302, an image processor 304, a memory 306, a control pad 310 and a controller 308. An imaging apparatus shown in FIG. 23 also includes a display 312.

First, the zoom lens barrel assembly 300 is the zoom lens barrel assembly 300 of illustrated embodiments of the present invention, as shown in FIGS. 1 to 21.

The zoom lens barrel assembly 300 is mounted on a digital camera (see FIGS. 23 and 24) having an inner zoom lens to realize a compact digital imaging apparatus. The zoom lens barrel assembly 300 has a reflective optical device, which perpendicularly modifies an optical path at an input end of image light, directed toward an object. Accordingly, image light, incident from the object outside the camera, is perpendicularly redirected through the zoom lens barrel assembly 300 before entering the image pickup 302.

The image pickup 302 converts the incident image light of the object, arrived through the zoom lens barrel assembly 300, into an image signal. For this purpose, the image pickup 302 may include a photoelectric transducer, such as a CCD or a CMOS, which converts the incident image light into an electric signal, a Correlated Double Sampling (CDS) circuit for damping the nose of the converted electric signal, an Auto Gain Control (AGC) circuit for compensating for the gain of the electric signal, various signal compensating circuits, and the like.

The image processor 304 processes an image, captured by the image pickup 302, to realize a digital image, and outputs the digital image. The image processor 304 performs specific image signal processing on the image signal output from the image pickup 302. The image signal processing may include contour correction, gamma correction, or Auto White Balance (AWB) processing, according to the design specification of a product. The image processor 304 converts the processed image into a specific format file, for example, a joint photographic coding experts group (JPEG) file, and sends the converted image to the memory 306.

The control pad 310 generates an image pickup command signal in response to the manipulation by the user. The control pad 310 may include various menu setup buttons, a power button, a zoom button and so on (see FIG. 25).

The memory 306 stores therein storage files or temporary storage image files, which are output from the image processor 304.

The controller 308 controls the image pickup 302 according to the image pickup command signal from the control block 310, controls the drive motor (e.g., a zoom motor and a third lens drive motor) of the zoom lens barrel assembly 300, and controls the image processing mode of the image processor 304.

The display 312 provides a preview screen of an image to be captured, and displays an image stored in the memory 306. The display 312 may be implemented with a Liquid Crystal Display (LCD). (See FIG. 25.)

FIGS. 23 and 24 shows an inner zoom type compact digital camera as an example of the digital imaging apparatus, which has the zoom lens barrel assembly of various embodiments of the present invention mounted therein. The compact digital camera includes a flash 401, a viewfinder 403, a lens cover 404, an embedded lens unit 405, a battery 402 and so on.

FIG. 24 shows the inside structure of a camera including an internal circuit 406, on which the components 302, 304, 306 and 308 of FIG. 23 are formed, and other components, in which the lens cover 404 is moved downward, thereby opening a lens aperture 407. In this position, when light from an outside object enters the digital camera through the lens aperture 407, the incident light is introduced to the CCD/CMOS in the image pickup circuit through the zoom lens barrel assembly 408 inside the camera.

A parts manufacturer makes and supplies zoom lens barrel assemblies, as indicated with the reference numeral 100 in FIG. 1 or 200 in FIG. 15, except for a camera body. Then, a finished product manufacturer produces finished products by mounting the zoom lens barrel assembly 408 in a digital imaging apparatus, as shown in FIGS. 24 and 25.

FIG. 25 is a rear elevation view of the digital pickup device of FIGS. 23 and 24. The digital pickup device includes a viewfinder 210, a display 418, various operation buttons 414, 415, 416 and 417, direction buttons 411 and 412, a zoom button 413 and so on, so that a user can operate the device and check the image in order to take pictures.

In the embodiments shown in FIGS. 23, 24 and 25, the inner zoom type digital camera is illustrated as an example of the digital imaging apparatus, in which various embodiments of the zoom lens barrel assembly of the present invention may be mounted. However, this is not intended to limit the imaging apparatus of various embodiments of the present invention. Rather, various embodiments of the present invention can be applied to other imaging apparatuses, such as a mobile phone camera, unchanged. In the case where the zoom lens barrel assembly is mounted in the mobile phone camera, the imaging apparatus can be embodied with a simple structure, in which the viewfinder 403 and the lens cover 404 of FIGS. 23 and 24 are omitted, and only a button acting as the zoom button 412 of FIG. 25 is provided.

The exemplary embodiments have been illustrated in the drawings and the specification, and it is to be understood that the terminologies used herein are intended to be in the nature of description rather than to limit the scope of the present invention as defined in the appended claims. Many modifications of the present invention and equivalents thereof are possible for those skilled in the art. Therefore, it is to be understood that the scope of the present invention shall be defined by the technical idea of the appended claims.

As set forth above, the zoom lens assembly of various embodiments of the invention redirects image light incident from an object to perform zoom and focusing operations along a bent optical path. Various embodiments of the zoom lens assembly can stably endure external impacts, provide more precise zoom operation, stably operate for a long time without a malfunction of a zoom motor, which acts as a drive source, and improve space utilization inside a basic skeletal structure of a frame. Furthermore, the compactness of a module mounted inside the electronic device can contribute to the size reduction of the electronic device, which is a major purchasing factor when selecting an electronic article. Accordingly, various embodiments of the invention are applicable to various electronic components.

| TABLE OF REFERENCE CHARACTERS | |
|---|---|
| OP1 | first optical axis |
| OP2 | second optical axis |
| 101 | fixed lens group |
| 102 | reflective optical device |
| 103, 104 | first zoom lens group |
| 105, 106, 107 | second zoom lens group |
| 108 | third zoom lens group |
| 111 | first zoom lens group member |
| 112 | first guide rib |
| 113 | first guide lug |
| 121 | second zoom lens group member |
| 122 | second guide rib |
| 123 | second guide lug |
| 130 | zoom motor |
| 131 | motor rotary shaft |
| 132, 133 | gear |
| 132' | worm gear |
| 133' | bevel gear |
| 141 | screw member |
| 142 | clip member |
| 143 | clip guide shaft |
| 144 | rotary cam member |
| 145 | groove |
| 146 | rotary cam boss |
| 149 | elastic member |
| 150 | guide rail |
| 151 | cam member |
| 152 | first cam slit |
| 153 | second cam slit |
| 155 | cam cover |
| 161, 162 | cam member guide |
| 163, 164 | measurement guide |
| 171, 172 | linear motion guide shaft |
| 180 | third lens group member |
| 181 | third lens group drive motor |
| 190, 192 | frame |
| 191 | zoom motor rotary shaft hole |

The invention claimed is:

1. A zoom lens barrel assembly in an optical system, which has at least two zoom lens groups arranged on a first optical axis, the zoom lens barrel assembly changing a distance between the lens groups on the first optical axis to adjust a zoom ratio of the optical system, comprising:

a zoom motor;

a rotary drive member connected to one end of the zoom motor, the rotary drive member acting as a rotary driving source for moving the second zoom lens group according to the zoom ratio;

at least one power transmission gear disposed between the zoom motor and the rotary drive member;

a second zoom lens group member coupled with the rotary drive member, wherein the second zoom lens group member performs a linear motion along the first optical axis, supports the second zoom lens group arranged along the first optical axis, and has a second guide lug at one position thereof;
a first zoom lens group member supporting the first zoom lens group arranged along the first optical axis, the first zoom lens group member having a first guide lug at one position thereof;
a cam member having first and second cam slits, the first cam slit receiving the first guide lug, the second cam slit receiving the second guide lug, wherein the cam member receives a driving force from the second zoom lens group through the second cam slit and slides across the first optical axis, thereby transmitting the driving force to the first zoom lens group member through the first cam slit while causing a change in the distance between the first and second zoom lens group members, and at least one of the first and second cam slits is U-shaped;
a cam cover disposed outside the cam member; and
a frame, with which the cam cover is coupled to prevent the cam member from being released,
wherein the zoom motor is placed in front of a reflective optical device on a basis of the first optical axis, and a portion of a rotary shaft of the zoom motor, protruding beyond the rotary shaft, is rotatably inserted into a hole of the frame.

2. The zoom lens barrel assembly according to claim 1, wherein the rotary drive member includes a screw member, which is rotated by a driving force from the zoom motor, and a clip member, which converts a rotation of the screw member into a linear motion.

3. The zoom lens barrel assembly according to claim 1, wherein the rotary drive member comprises a rotary cam member, which has a groove formed in the surface of a circular column, wherein the rotary cam member is rotated by a driving force from the zoom motor to reciprocally move the second zoom lens group member along the first optical axis.

4. The zoom lens barrel assembly according to claim 3, wherein the rotary cam member has different inclinations of the groove, which vary along an axial length of the rotary cam member, so that an interval velocity at which the zoom lens moves varies along the axial length.

5. The zoom lens barrel assembly according to claim 3, further comprising an elastic member disposed between the first and second zoom lens groups, the elastic member expanding or contracting according to the zoom ratio.

6. The zoom lens barrel assembly according to claim 1, wherein the power transmission gear includes a worm gear, which is coupled with the rotary shaft of the zoom motor, and a worm wheel or a bevel gear, which is rotatably meshed with the worm gear.

7. The zoom lens barrel assembly according to claim 1, further comprising:
the reflective optical device, which is disposed around the first zoom lens group facing an object along the first optical axis, thereby converting a path of incident light, introduced along a second optical axis, crossing the first optical axis, toward the first optical axis; and
a fixed lens group, which is disposed around the reflective optical device facing the object along the second optical axis opposite the object,
wherein image light introduced from the object sequentially passes through the fixed lens group, the reflective optical device, the first zoom lens group and the second zoom lens group.

8. The zoom lens barrel assembly according to claim 1, further comprising:
a third zoom lens drive motor; and
a third zoom lens group driven by the third zoom lens drive motor, and cooperating with the first zoom lens group and the second zoom lens group along the same optical axis as the first zoom lens group and the second zoom lens group,
wherein the third zoom lens group is disposed around the second zoom lens facing an image, and moves in a direction reverse to that of the second zoom lens group, thereby enabling a focusing operation according to the zoom ratio.

9. The zoom lens barrel assembly according to claim 1, wherein the zoom motor and the rotary drive member are arranged parallel to the first optical axis.

10. The zoom lens barrel assembly according to claim 2, wherein the power transmission gear includes a worm gear, which is coupled with the rotary shaft of the zoom motor, and a worm wheel or a bevel gear, which is rotatably meshed with the worm gear.

11. The zoom lens barrel assembly according to claim 2, further comprising:
the reflective optical device, which is disposed around the first zoom lens group facing an object along the first optical axis, thereby converting a path of incident light, introduced along a second optical axis, crossing the first optical axis, toward the first optical axis; and
a fixed lens group, which is disposed around the reflective optical device facing the object along the second optical axis opposite the object,
wherein image light introduced from the object sequentially passes through the fixed lens group, the reflective optical device, the first zoom lens group and the second zoom lens group.

12. The zoom lens barrel assembly according to claim 2, further comprising:
a third zoom lens drive motor; and
a third zoom lens group driven by the third zoom lens drive motor, and cooperating with the first zoom lens group and the second zoom lens group along the same optical axis as the first zoom lens group and the second zoom lens group,
wherein the third zoom lens group is disposed around the second zoom lens facing an image, and moves in a direction reverse to that of the second zoom lens group, thereby enabling a focusing operation according to the zoom ratio.

13. The zoom lens barrel assembly according to claim 2, wherein the zoom motor and the rotary drive member are arranged parallel to the first optical axis.

14. The zoom lens barrel assembly according to claim 3, wherein the power transmission gear includes a worm gear, which is coupled with the rotary shaft of the zoom motor, and a worm wheel or a bevel gear, which is rotatably meshed with the worm gear.

15. The zoom lens barrel assembly according to claim 3, further comprising:
the reflective optical device, which is disposed around the first zoom lens group facing an object along the first optical axis, thereby converting a path of incident light, introduced along a second optical axis, crossing the first optical axis, toward the first optical axis; and
a fixed lens group, which is disposed around the reflective optical device facing the object along the second optical axis opposite the object,
wherein image light introduced from the object sequentially passes through the fixed lens group, the reflective optical device, the first zoom lens group and the second zoom lens group.

16. The zoom lens barrel assembly according to claim 3, further comprising:
- a third zoom lens drive motor; and
- a third zoom lens group driven by the third zoom lens drive motor, and cooperating with the first zoom lens group and the second zoom lens group along the same optical axis as the first zoom lens group and the second zoom lens group,
- wherein the third zoom lens group is disposed around the second zoom lens facing an image, and moves in a direction reverse to that of the second zoom lens group, thereby enabling a focusing operation according to the zoom ratio.

17. The zoom lens barrel assembly according to claim 3, wherein the zoom motor and the rotary drive member are arranged parallel to the first optical axis.

18. The zoom lens barrel assembly according to claim 4, wherein the power transmission gear includes a worm gear, which is coupled with the rotary shaft of the zoom motor, and a worm wheel or a bevel gear, which is rotatably meshed with the worm gear.

19. The zoom lens barrel assembly according to claim 4, further comprising:
- the reflective optical device, which is disposed around the first zoom lens group facing an object along the first optical axis, thereby converting a path of incident light, introduced along a second optical axis, crossing the first optical axis, toward the first optical axis; and
- a fixed lens group, which is disposed around the reflective optical device facing the object along the second optical axis opposite the object,
- wherein image light introduced from the object sequentially passes through the fixed lens group, the reflective optical device, the first zoom lens group and the second zoom lens group.

20. The zoom lens barrel assembly according to claim 4, further comprising:
- a third zoom lens drive motor; and
- a third zoom lens group driven by the third zoom lens drive motor, and cooperating with the first zoom lens group and the second zoom lens group along the same optical axis as the first zoom lens group and the second zoom lens group,
- wherein the third zoom lens group is disposed around the second zoom lens facing an image, and moves in a direction reverse to that of the second zoom lens group, thereby enabling a focusing operation according to the zoom ratio.

21. The zoom lens barrel assembly according to claim 4, wherein the zoom motor and the rotary drive member are arranged parallel to the first optical axis.

22. The zoom lens barrel assembly according to claim 5, wherein the power transmission gear includes a worm gear, which is coupled with the rotary shaft of the zoom motor, and a worm wheel or a bevel gear, which is rotatably meshed with the worm gear.

23. The zoom lens barrel assembly according to claim 5, further comprising:
- the reflective optical device, which is disposed around the first zoom lens group facing an object along the first optical axis, thereby converting a path of incident light, introduced along a second optical axis, crossing the first optical axis, toward the first optical axis; and
- a fixed lens group, which is disposed around the reflective optical device facing the object along the second optical axis opposite the object,
- wherein image light introduced from the object sequentially passes through the fixed lens group, the reflective optical device, the first zoom lens group and the second zoom lens group.

24. The zoom lens barrel assembly according to claim 5, further comprising:
- a third zoom lens drive motor; and
- a third zoom lens group driven by the third zoom lens drive motor, and cooperating with the first zoom lens group and the second zoom lens group along the same optical axis as the first zoom lens group and the second zoom lens group,
- wherein the third zoom lens group is disposed around the second zoom lens facing an image, and moves in a direction reverse to that of the second zoom lens group, thereby enabling a focusing operation according to the zoom ratio.

25. The zoom lens barrel assembly according to claim 5, wherein the zoom motor and the rotary drive member are arranged parallel to the first optical axis.

\* \* \* \* \*